United States Patent [19]
Allen et al.

[11] 3,823,311
[45] July 9, 1974

[54] SUM OF CROSS PRODUCTS MULTIPLICATION AND ROUNDING

[75] Inventors: Kenneth C. Allen; Edwin E. Boshinski, both of Dayton, Ohio

[73] Assignee: The Hobart Manufacturing Company, Troy, Ohio

[22] Filed: July 6, 1973

[21] Appl. No.: 369,282

Related U.S. Application Data

[60] Continuation of Ser. No. 85,139, Oct. 29, 1970, abandoned, which is a division of Ser. No. 422,730, Dec. 31, 1964, Pat. No. 3,557,353.

[52] U.S. Cl. ...... 235/160, 235/92 DM, 235/92 WT, 235/156
[51] Int. Cl. ............................................. G06f 7/52
[58] Field of Search ........... 235/160, 159, 164, 156, 235/92 DM, 92 WT

[56] References Cited
UNITED STATES PATENTS

| | | | |
|---|---|---|---|
| 3,055,585 | 9/1962 | Bell et al. | 235/160 |
| 3,081,031 | 3/1963 | Livesay | 235/160 |
| 3,084,285 | 4/1963 | Bell et al. | 235/160 X |
| 3,205,956 | 9/1965 | Bell et al. | 235/92 WT X |
| 3,329,807 | 7/1967 | Currie, Jr. et al. | 235/159 |

FOREIGN PATENTS OR APPLICATIONS

| | | | |
|---|---|---|---|
| 239,528 | 12/1959 | Australia | 235/160 |
| 654,697 | 12/1962 | Canada | 235/160 |

*Primary Examiner*—Malcolm A. Morrison
*Assistant Examiner*—David H. Malzahn
*Attorney, Agent, or Firm*—Biebel, French & Bugg

[57] ABSTRACT

A computing and printing scale system includes a pulse generator and an optical scale incorporating a mechanism which reads out the balance position of the platter and stores the weight information by selective transmission of pulses directly to a series of pulse counters each representing one column of weight information. Thereafter, the value of the weighed load at a preset unit price is computed by selective transmission of pulses to a series of value counters in accordance with partial product multiplication of the digits of weight and unit price, controlled in part by the weight counters. Finally, the weight and value information stored in the counters is transmitted to a printer-register which prints the information on a label.

4 Claims, 15 Drawing Figures

PATENTED JUL 9 1974 3,823,311

INVENTORS
KENNETH C. ALLEN &
BY EDWIN E. BOSHINSKI

*Marechal, Biebel, French & Bugg*
ATTORNEYS

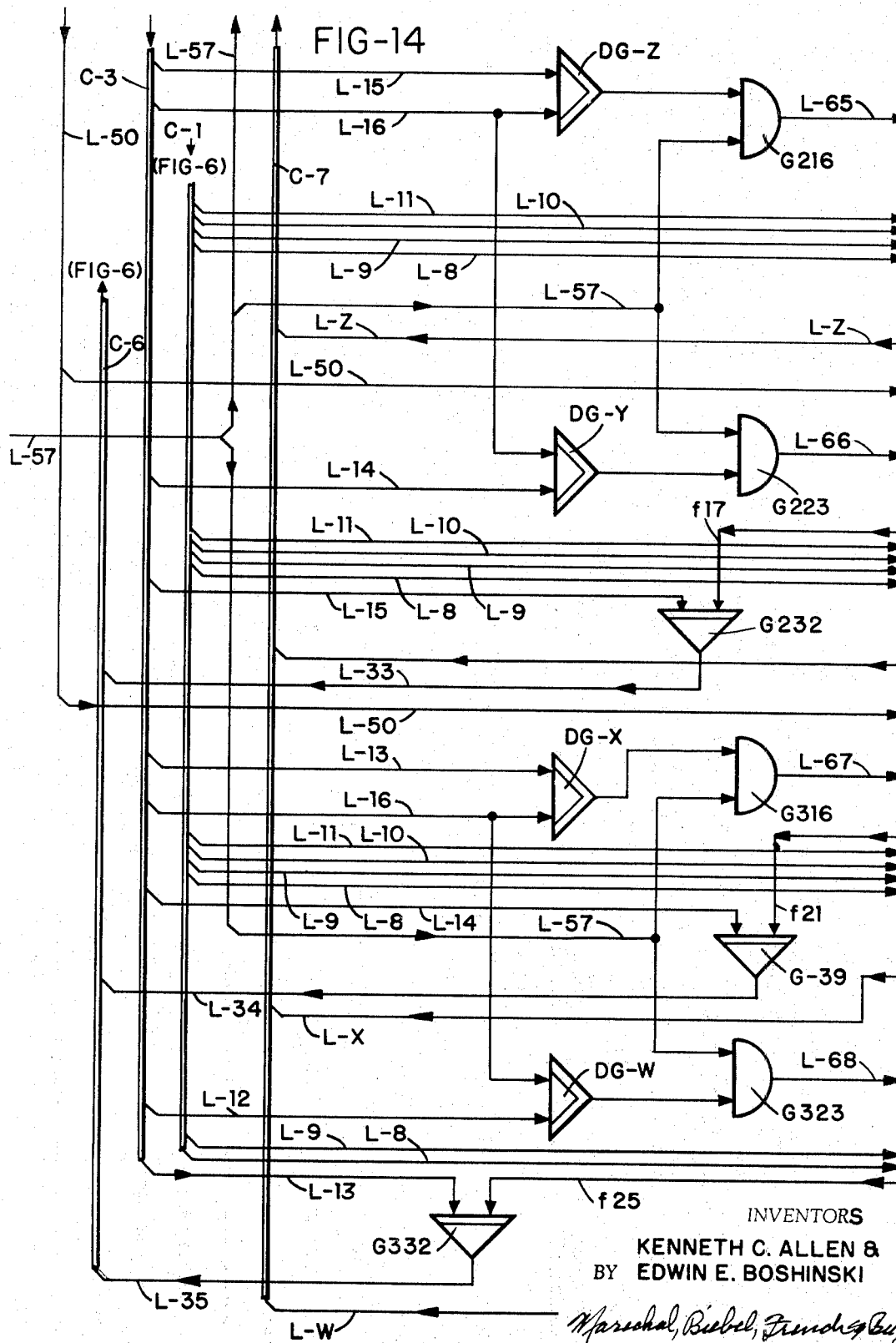

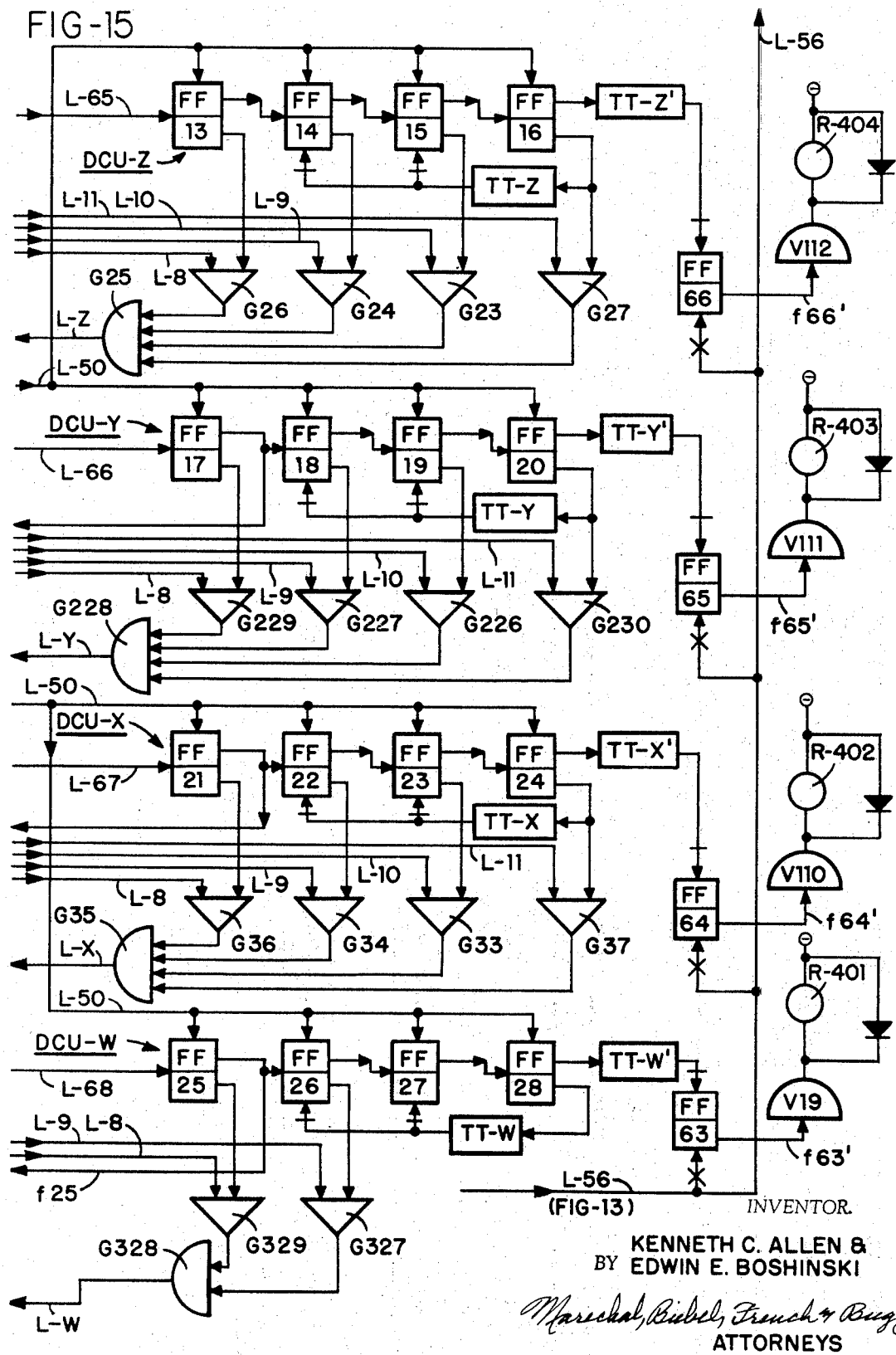

SUM OF CROSS PRODUCTS MULTIPLICATION AND ROUNDING

This application is a continuation of our application Ser. No. 85,139, filed Oct. 29, 1970, now abandoned which in turn is a division of our application Ser. No. 422,730, filed Dec. 31, 1964 and now issued as U.S. Pat. No. 3,557,353.

This invention relates to computers, particularly for use in computing scale systems which include a scale and a computer for weighing and automatically computing and recording the price of each of successively weighed loads or articles.

A system of the general type to which the invention relates is shown in Allen U.S. Pat. No. 3,045,229, and some of the components of that system, which may be incorporated in the system of the present invention, are shown in more detail in earlier patents noted in U.S. Pat. No. 3,045,229 and specifically referred to hereinafter.

The preferred embodiment of the present invention which is described in detail hereinafter is characterized by a solid state computing system which includes a pulse generator, a program counter and a plurality of pulse counters, and all operations of read out, storage and computing are effected by appropriate control of the transmission of pulses throughout the system. Thus the scale is read out by photoelectric transducers, and the weight digits are temporarily stored in counters which receive the proper number of pulses through gates controlled by the photoelectric transducers in accordance with the balance position of the scale. These weight storage counters then cooperate with other counters and price selector switches to operate additional gates which control the transmission of pulses to value storage counters in accordance with partial product multiplication. Finally, the weight and value storage counters transmit their stored information to a printer which prints and issues a ticket or label bearing therein the unit price, weight and value of the related load.

It is a primary object of the present invention to provide a system of the general characteristics outlined above which can be produced at less cost than previously available systems for the same purpose and which will have the additional advantage of increased speed of operation and reduced maintenance and service requirements.

Another object of the invention is to provide a computing system of relatively simple construction composed entirely of solid state elements which is especially adapted for incorporation with a weighing scale to form an automatic weighing, computing and recording system, and a specific object of the invention is to provide such a system which is composed primarily of pulse counters and gates and wherein the appropriate sequential operations of the several counters and gates are programmed by an additional pulse counter.

Further objects and advantages will be apparent from the following description, the accompanying drawings and appended claims.

In the drawings:

FIGS. 6–15 form in combination a logic diagram in accordance with the invention for the system of FIG. 1.

Figure 1:
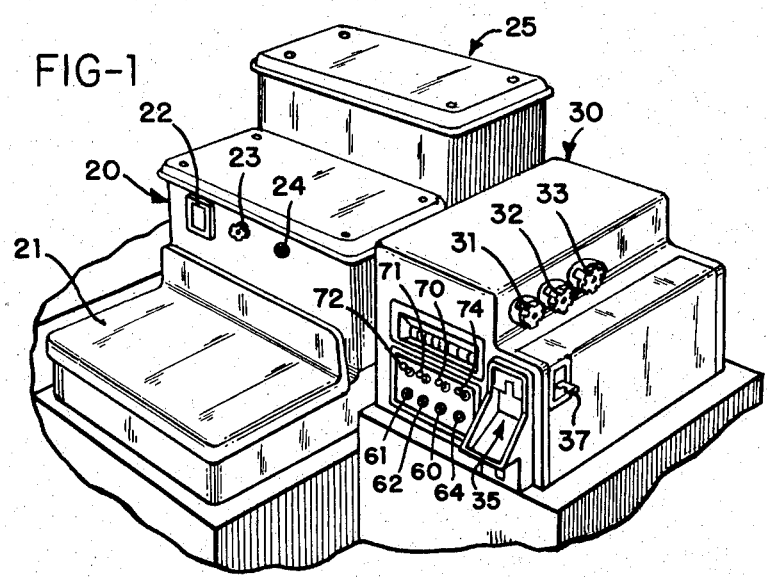
FIG. 1 is a perspective view showing a complete weighing, computing and printing system constructed in accordance with the invention.

Referring to the drawings, which illustrate preferred embodiments of the invention, FIG. 1 represents an automatic computing scale system in accordance with the invention which includes a weighing scale 20 having a scale platter 21. The scale 20 is shown as including a window 22 for visually reading the weight, a tare adjustment knob 23, and a signal light 24 which is lighted whenever the tare setting may require adjustment.

The computer 25 is shown as mounted adjacent the scale 20, and it receives the weight information from the scale for combining with a selected price per unit of weight to compute the value of a weighed article. The computer 25 supplies the weight and value information to the register-printer 30, which is shown and referred to hereinafter as constructed according to United States patent to Allen U.S. Pat. No. 2,948,465. The register-printer 30 is provided with switches 31–33 having manual control knobs 31', 32' and 33' which correspond respectively to cents, dimes and dollars per pound and are operatively connected with contacts 34 (FIG. 7) in the computer 25 through wipers 31'', 32'' and 33'' as described hereinafter to determine the unit price of each article to be weighed. The register-printer 30 also incorporates a ticket ejector mechanism indicated at 35 and referred to hereinafter as constructed according to United States patent to Allen et al. U.S. Pat. No. 2,948,466. The printer 30 includes type wheels 36 (FIG. 13) and a commodity key 37, and it cooperates with the ejector 35 to print and issue a label showing the commodity weighed, the unit price, weight and computed value, a typical such label being shown as 40 in FIG. 3.

The computer of the invention does not depend upon any specific construction of scale, as will become apparent in the course of the following description, but it is described initially in conjunction with a scale which is generally constructed in accordance with United States patent to Meeker et al. U.S. Pat. No. 2,723,113. Pertinent parts of scale 20 are shown diagrammatically in FIG. 2 as including a lever 44, which constitutes a part of the weighing mechanism connected for movement with the platter 21, and an optical chart 45 which is supported for movement by the lever 44 according to the balance position of the scale platter 21. Weight information, i.e. a range of weights, is encoded on the chart 45 into closely spaced rows 46 of binary markings shown with exaggerated spacing in FIG. 2. The chart 45 forms a part of an optical projection system which is shown diagrammatically as including a fixed projection lamp 50 and a lens 51 to concentrate the light of the lamp filament on the chart 45. A lens 52 projects an enlarged image of a small vertical extent of the chart rows 46 which is read-out to determine the balance position of the scale.

Figure 2:
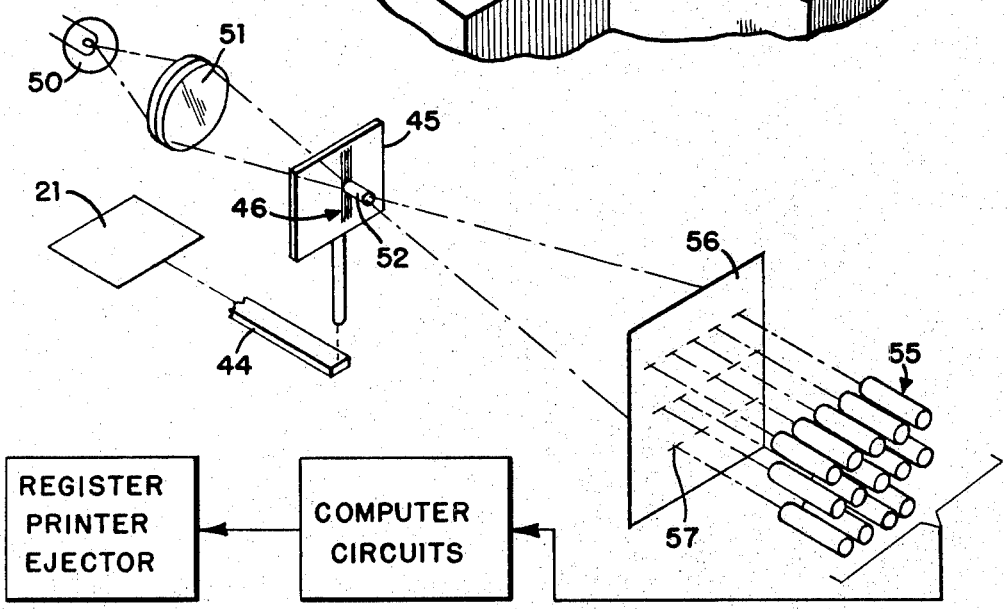
FIG. 2 is a diagrammatic view of a fragment of the system of FIG. 1.

FIG. 2 shows photoelectric means for reading out the portion of the chart 45 corresponding to the weight on the platter, comprising a plurality of photocells 55, one for each of the rows 46, and a cooperating mask 56. Each photocell 55 is positioned immediately behind a slit in the mask 56, but for ease of illustration, the photocells 55 are shown in FIG. 2 as being spaced away from the mask. The photocells 55 undergo a decrease in resistance with light falling on the photocell window, to operate as current gates or valves, and a photocell which has been found useful for this purpose is designated type CL 604 manufactured by Clairex Corporation, 19 West Twenty-sixth Street, New York 10, New York.

There are provided as many of the photocells 55 as there are rows of binary information on the chart 45, and in this embodiment, fourteen photocells are employed. In order to conserve space within the optical system, and to position the cells 55 as closely to the center of the optical axis as practicable, five photocells are arranged in each of two rows and four in the third row, with each of the photocells 55 being spaced both laterally and vertically from the adjacent cells and from the cells in the adjacent rows.

The mask 56 includes image-defining openings or slits 57, one for each of the photocells 55. The slits 57 may be approximately .010 inch wide and are accurately positioned in relation to the projected image of the rows 56 on the chart 45. Accordingly, the relative weight-corresponding positions of the rows on the chart 45 are staggered in three groups to conform to the position of the slits 57 in the mask 56, and the slits 57 minimize the necessity for accurate positioning of the photocells with respect to the projected pattern.

The photocells 55 are designated individually by the letters A to N in the detailed description hereinafter. Their outputs are supplied to the circuits for reading out and converting the binary coded information into its decimal equivalents, as described hereinafter in connection with FIGS. 6–15. The binary equivalent of the weight to the closest one hundredth of a pound is then supplied to the computer 25.

The computer of the invention will be described herein as utilizing a cyclic or reflected binary counting system wherein it is possible to count to any number by changing only a single item of information for each successive numerical change in the common decimal system. An example of this system is shown in Table I, wherein there is a column of decimal numbers on the left and a column of cyclic decimal numbers on the right. Table I shows that as the count moves from 9 to 10 in the decimal system, the cyclic decimal system changes from 9 to 19 and counts downwardly to the cyclic decimal 10, which corresponds in turn to 19 in the decimal system. In moving from 19 to 20 in the decimal system, both digits must be changed, but in the corresponding portion of the cyclic system, the digits change from 10 to 20 and only one digit is changed, from a 1 to a 2 in the second column. Obviously, such a counting system can be extended indefinitely.

The rule for translating cyclic decimals into natural decimals can be stated as follows: Examining the cyclic decimal columns, the farthest left number is always a correct decimal number. If this number is even, the succeeding number to the right is also a correct decimal number. However, if the farthest left number is odd, then the 9's complement of the succeeding number must be used. The correct meaning of the third digit from the left is determined in the same manner, depending upon whether or not the translated true decimal number of the previous digit is odd or even. Thus the use of the natural number or its 9's complement is dependent upon whether the translated true number immediately to its left is odd or even.

The cyclic biquinary numbering system shown in Table II has been derived from the above system. Here each single decimal number is represented by a pair of digits, the digits 0 to 4 being used in the lower order of the pair and 0 or 1 in the higher order of the pair. The occurrence of 0 to 1 in the higher order of the pair directs whether the lower order represents a true number or its 9's complement.

The significance of the 0 or the 1 in the higher order of each pair of numbers is dependent upon whether the translated true number of the next higher order pair of digits is odd or even. If the next higher decimal number is even, the 0 directs the use of the significant number and the 1 directs the use of its 9's complement. The meaning of 0 or 1 is reversed if the higher order translated true number is odd. For example, in Table II, the cyclic biquinary number 00 13 dictates that the true decimal number is 6, which is the 9's complement of 3. In this example, the higher order decimal is an "even" 0 so that the 1 in the second column directs the use of the 9's complement of 3. By contrast, the cyclic biquinary number 01 13 calls first for a true decimal 1 in the higher order. This being odd, the significance of the 1 in the lower order pair is reversed and the true decimal number is therefore 13. Table II shows additional examples of this system of counting.

Table III represents the cyclic biquinary code of Table II in binary form. In Table III, four columns or rows of binary indications are employed to indicate a single decimal column. The first three rows of each grouping of four rows represent whole decimal numbers of 0 through 4, and the fourth row indicates whether or not the 9's complement of the number represented by the first three rows is intended.

The arrangement of binary indications representing 0 through 4 may take any one of several forms, but once this is determined, it is maintained uniformly throughout the counting system. In Table III, the numeral 1 is employed to indicate the occurrence or presence of a binary indication or digit, and the 0 is used to indicate the absence of a binary indication. Preferably, some form of indication is employed to represent a true zero rather than the lack of indication as is commonly employed in binary systems. Therefore, 0001 represents the whole decimal number 0 in each of the groups of rows or columns.

Further examination of Table III shows that the reflective repetition of the binary indications in the first three rows occurs in five-digit increments. In other words, the count is from 0 to 4 in the first three columns, and then a 1 indication is added to the fourth or complements indicating column, while the binary indications of 5 through 9 represent a "reflection" or reversal of the indications of 0 through 4.

The preferred embodiment of this invention is described hereinafter in conjunction with a computing scale system having a maximum weighing capacity of 25.00 pounds and a maximum unit price of $9.99. The scale described herein accordingly uses three groups of four columns of binary markings which represent respectively hundredths of a pound, tenths of a pound, pounds and tens of pounds of weight on the scale platter. Only two binary rows are required to represent the tens of pounds since this will either be 0, 1 or 2. In Table III, fourteen columns of binary indications are employed to count to 25.00 (but are in fact capable of counting to 29.99) by changing only one binary indication for each successive change in the digital value of the weight.

The "A" through "N" indications in Table III above the several columns designate the above fourteen columns and also designate the corresponding photocells A through N, which are individually operated in accordance with the binary indication at any particular balance position within the weighing range of the scale. Examination of Table III indicates that particular groups of the photocells A through N will be operated for each decimal position. Thus photocells ABCD correspond to hundredths of a pound, EFGH correspond to tenths of a pound, IJKL correspond to pounds, and MN correspond to tens of pounds. These same columns, or rather the values therein, are designated in the following description of the computer as represented by the letters Z, Y, X, and W, respectively. The operation of the photocells representing a single column is illustrated in Table IV, namely the photocells A, B, C and the complement's indicator photocell D for the successive digits 0 to 9 in the column Z, and each of the other groups of photocells are similarly coded for the digits in the respective columns which they represent.

TABLE I

| Decimal | Cyclic Decimal |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 19 |
| 11 | 18 |
| 12 | 17 |
| 13 | 16 |
| 14 | 15 |
| 15 | 14 |
| 16 | 13 |
| 17 | 12 |
| 18 | 11 |
| 19 | 10 |
| 20 | 20 |

TABLE II

| Decimal | Cyclic Biquinary |
|---|---|
| 0 | 00 00 |
| 1 | 00 01 |
| 2 | 00 02 |
| 3 | 00 03 |
| 4 | 00 04 |
| 5 | 00 14 |
| 6 | 00 13 |
| 7 | 00 12 |
| 8 | 00 11 |
| 9 | 00 10 |
| 10 | 01 10 |
| 11 | 01 11 |
| 12 | 01 12 |
| 13 | 01 13 |
| 14 | 01 14 |
| 15 | 01 04 |
| 16 | 01 03 |
| 17 | 01 02 |
| 18 | 01 01 |
| 19 | 01 00 |
| 20 | 02 00 |

TABLE III

Binary – Cyclic – Biquinary

| | NM | LKJI | HGFE | DCBA |
|---|---|---|---|---|
| 0 | 01 | 0001 | 0001 | 0001 |
| 1 | 01 | 0001 | 0001 | 0011 |
| 2 | 01 | 0001 | 0001 | 0010 |
| 3 | 01 | 0001 | 0001 | 0110 |
| 4 | 01 | 0001 | 0001 | 0100 |
| 5 | 01 | 0001 | 0001 | 1100 |
| 6 | 01 | 0001 | 0001 | 1110 |
| 7 | 01 | 0001 | 0001 | 1010 |
| 8 | 01 | 0001 | 0001 | 1011 |
| 9 | 01 | 0001 | 0001 | 1001 |
| 10 | 01 | 0001 | 0011 | 1001 |
| 11 | 01 | 0001 | 0011 | 1011 |
| 12 | 01 | 0001 | 0011 | 1010 |
| 13 | 01 | 0001 | 0011 | 1110 |
| 14 | 01 | 0001 | 0011 | 1100 |
| 15 | 01 | 0001 | 0011 | 0100 |
| 16 | 01 | 0001 | 0011 | 0110 |
| 17 | 01 | 0001 | 0011 | 0010 |
| 18 | 01 | 0001 | 0011 | 0011 |
| 19 | 01 | 0001 | 0011 | 0001 |
| 20 | 01 | 0001 | 0010 | 0001 |

TABLE IV

| 0 | = | A |
|---|---|---|
| 1 | = | AB |
| 2 | = | B |
| 3 | = | BC |
| 4 | = | C |
| 5 | = | CD |
| 6 | = | BCD |
| 7 | = | BD |
| 8 | = | ABD |
| 9 | = | AD |

Figure 4:
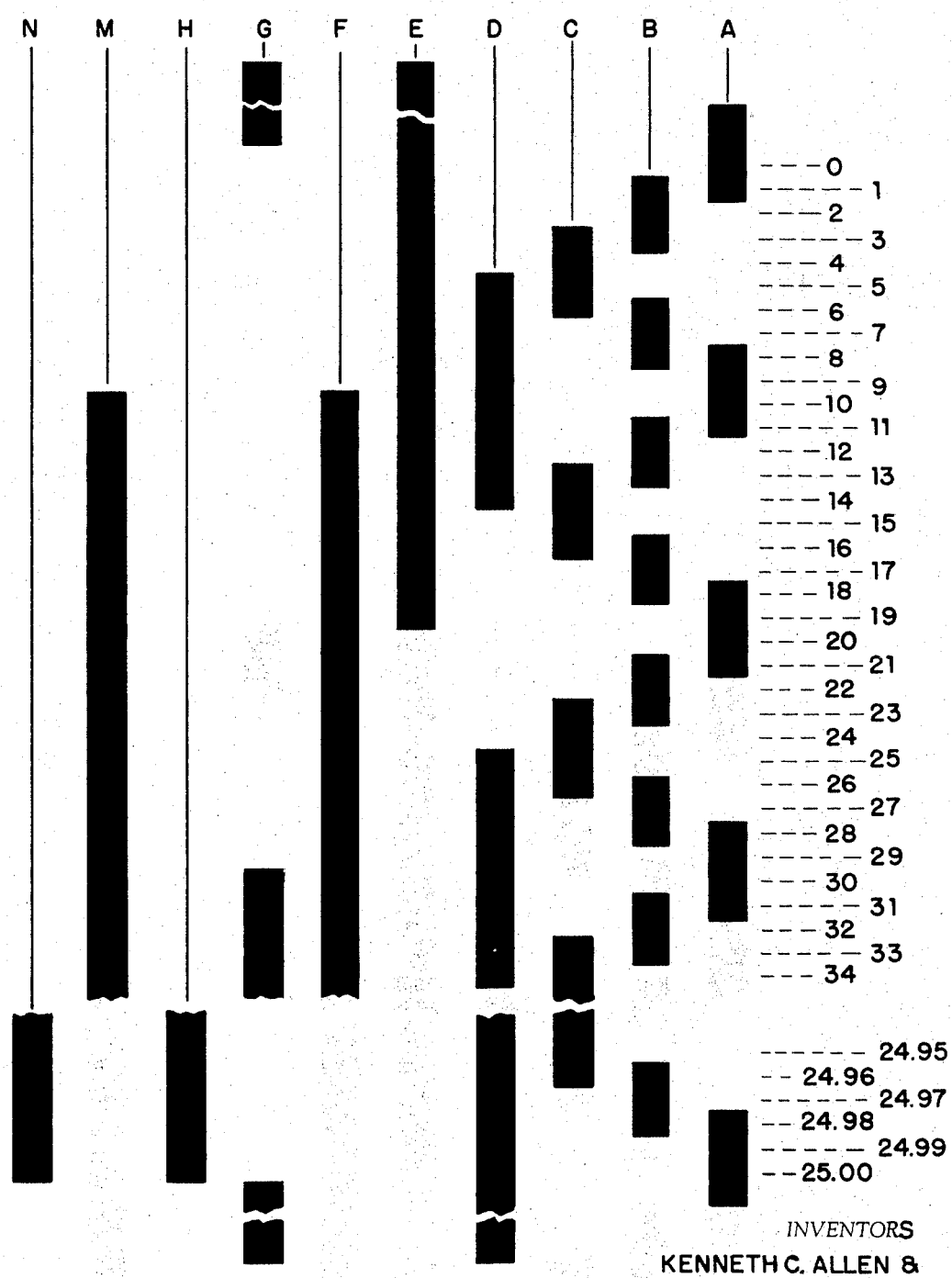
FIG. 4 is an enlarged fragmentary view of a portion of an optical chart constituting a part of the read-out section of the system of the invention.

The above-described cyclic biquinary code is applied in binary form to the chart 45 in fourteen vertically arranged columns A through N. A fragment of columns A through D on chart 45 is illustrated in FIG. 4, beginning at zero pounds and extending through thirty-three hundredths of a pound (0.33 pound) in one hundredths of a pound increments, and also including a fragment of the high weight end of the chart. The dark binary indications of the code as shown in FIG. 4 are actually formed on the chart as clear or transparent areas wherein light is permitted to fall on the photocells, thus effecting a decrease in the resistance, signalling the coincidence of the associated slit 57 with the projected image of the chart at one of the 1 binary indications. The 0 binary bits comprise the areas on the chart 45 which are actually opaque.

The physical arrangement of the rows A through N of binary indications may be varied on the chart 45 within wide limits, as long as the associated photocell 55 and slit 57 reading the particular column are correspondingly located to receive the projected image of the particular column which it is to scan. Thus the columns A–N may be formed concentrically on a disk, or wrapped about a drum. Preferably, they are arranged linearly side-by-side in a plane on a photographic plate. The binary indications of the column are staggered vertically in three groups to correspond to the physical placement or grouping of the corresponding photocells 55 and mask slits 57, but for convenience of explanation, they are shown in FIG. 4 as if all fourteen photocells were arranged in alphabetical order in a single line.

The M and N photocells are used as noted to read tens of pounds, and the binary code is: M = 0, MN = 1 and N = 2. Since "no M" could also be equal to zero, the M photocell and its column on chart 45 are used to detect when the scale is in a balance position within a predetermined low range above zero, and the circuits are arranged to prevent automatic operation of the computer under these conditions. The phsyical provisions for effecting this result involve causing the M photocell to be dark (non-conductive) when the scale is within such low range, for example, from 0 to .10 pound, as indicated in FIG. 4. Thus photocell M is lighted only above .10 pound, and a signal in either of the M and N columns will indicate that the weight on the scale is in excess of .10 pound.

It will also be noted in FIG. 4 that the areas for energizing the E AND G photocells are extended below zero and beyond 25.00 pounds. The reason for this arrangement is to provide a signal when the balance position of the scale is below zero or above its calibrated capacity, as will be explained in detail hereinafter in connection with the logic diagram.

Figure 13:
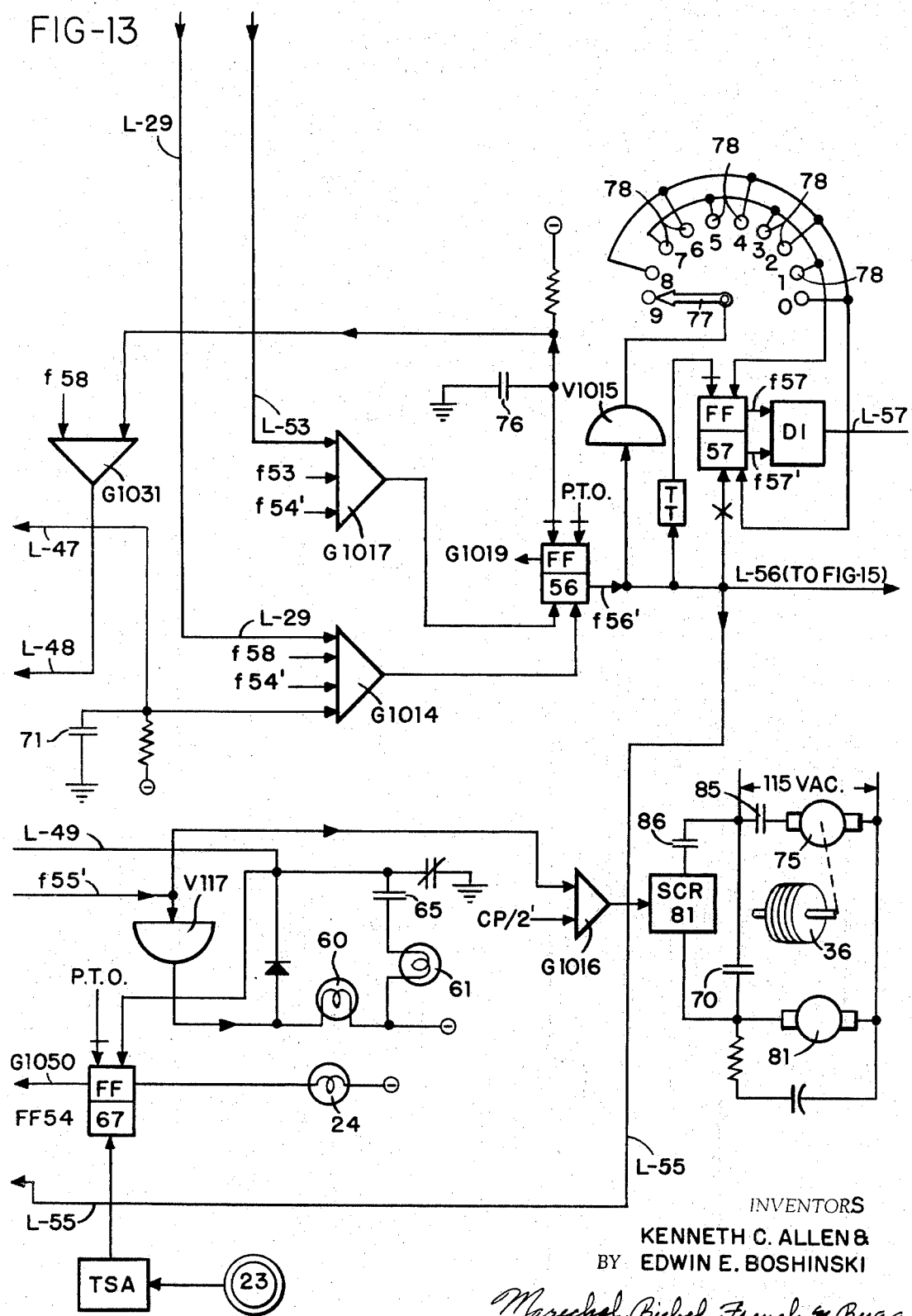

There are four signal lights mounted on the front of the printer 30 which may be energized during operation of the system. The error light 60 is energized automatically in the event of improper operation of the computer or printer, too greater a weight on the platter for the capacity of the scale, or a balance position below zero. The light 61 is the Change Price light which is energized whenever the price selecting knobs 31–33 are inaccurately set or are not changed following change in the weighing of one commodity to another in essentially the same manner as described in Allen U.S. Pat. No. 2,948,465. The light 62 is a warning light signalling approaching exhaustion of the supply of paper on which the successive tickets are printed and corresponds to light "395" in U.S. Pat. No. 2,948,465, and the light 63 is an indicator which is lighted whenever the power is turned on. FIG. 13 shows the connection of the lights 60 and 61 in the circuit, and their operative relation with the mechanical switch 65 which corresponds to the switch "501" in U.S. Pat. No. 2,948,465.

To complete the description of the mechanical parts of the system which may be actuated to control its operation, there are four mechanical switches mounted with their operating arms or buttons on the front of the printer 30. The Reset switch 70 is actuated to correct for certain errors which may occur in operation of the system as described hereinafter. The Repeat switch 71 causes the printer to issue a plurality of identical labels for packages of a fixed weight. The Manual Start switch 72 is used primarily to initiate manual operation of the complete cycle for test purposes or when the load on the platter is below .10 pound, and the switch 74 is the main power turn on switch related to the signal light 64.

Certain mechanical parts which are shown in the wiring diagram may be most readily identified at this point by reference to corresponding parts in issued patents. Thus the printer motor 75 (FIG. 13) is the motor which drives the mechanical parts of the printer 30, including the printer wheels 36 indicated diagrammatically in FIG. 13, and it corresponds to the motor "150" in Allen U.S. Pat. No. 2,948,465. Among the parts driven by this motor 75 are the cam operated switch 76 and the scanner 77, which corresponds to the switch "535" and scanner "300" in U.S. Pat. No. 2,948,465. The contacts 78 correspond to the contacts 301 in the same patent and cooperate with the scanner 77. The printer 30 also includes the plurality of solenoids R401–R408 in FIGS. 10 and 15, which have switch contacts 401–408 shown in FIG. 12 and which correspond to the solenoids "285" in U.S. Pat. No. 2,948,465 for setting the corresponding type wheels 36 to the proper positions for the respective digits of weight and price and are therefore referred to as key solenoids.

Figure 12:
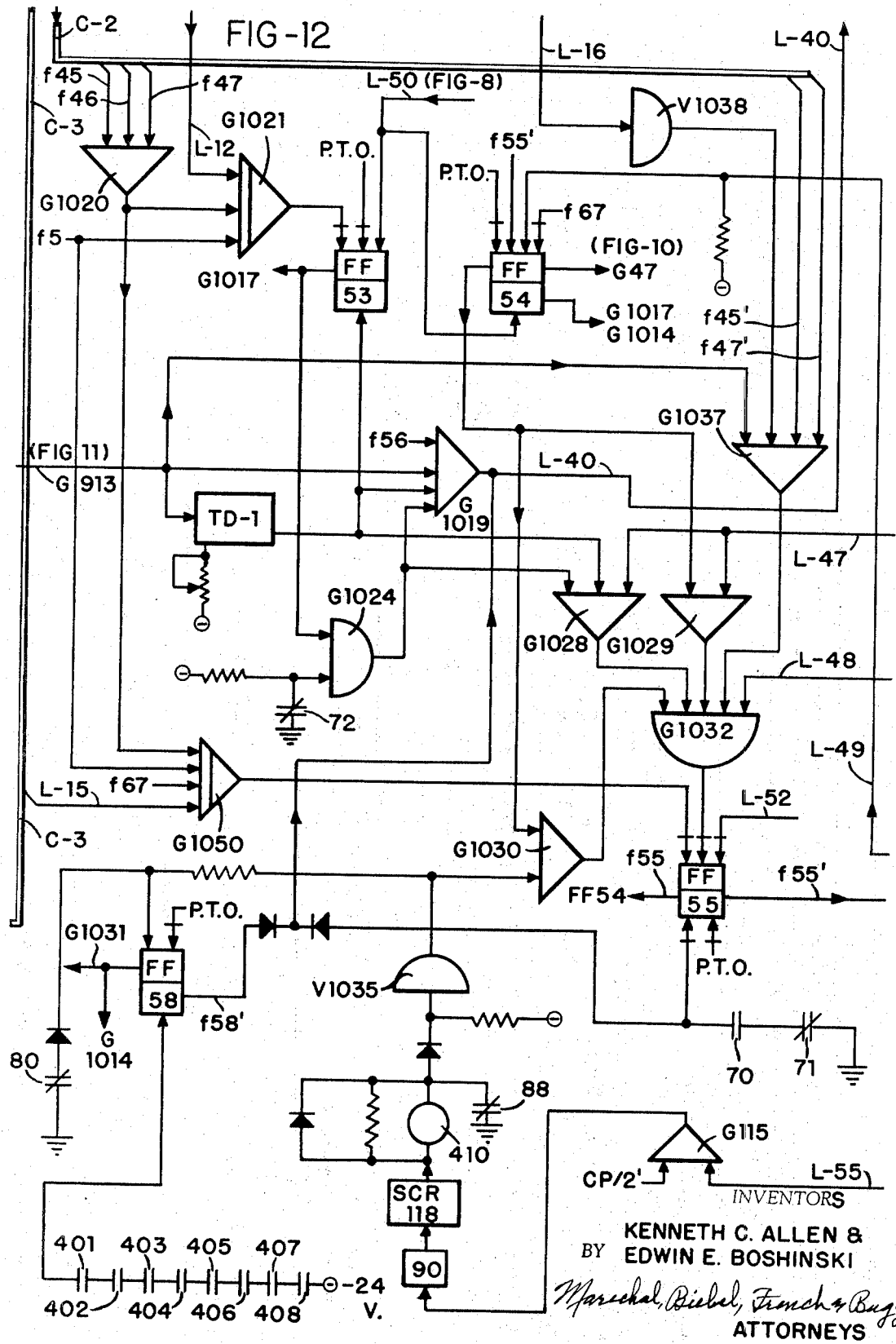

The switch 80 in FIG. 12 is a mechanical switch which is normally opened momentarily and then closed as an incident to withdrawal of the ticket issued by the ticket ejector 35, and it corresponds to the switch "80" in Allen et al. U.S. Pat. No. 2,948,466. The motor 81 (FIG. 13) drives certain mechanical parts of the ticket ejector 35 and corresponds to the motor "50" in U.S. Pat. No. 2,948,466, and it will be apparent that a single motor could be provided for performing the functions of the two motors 75 and 81, but the two-motor arrangement has been found to be convenient.

The printer motor 75 is controlled by switch contacts 85 which initially are closed mechanically in response to energization of the solenoid R410 (FIG. 12) and thereafter are held closed by a part of the printing mechanism until the printing cycle is completed, as is described in connection with solenoid "160" and switch contacts "171" in U.S. Pat. No. 2,948,465. The switch 86 is similarly closed in response to energization of the solenoid coil R410 to start the ejector motor 81. The normally closed contacts 88 in the energizing line to solenoid R410 are mechanically controlled by the printer mechanism to open at the same time switches 85 and 86 are closed and thereby to deenergize coil R410.

The logic diagram comprising FIGS. 6–15 shows one complete system in accordance with the invention which incorporates photocell read-out circuits and utilizes the cyclic binary biquinary code as described above. For convenience of understanding, FIG. 5 identifies many of the symbols used in the wiring diagram, as to which some further brief explanation here may be helpful. Thus in all cases, the arrowheads indicate the direction of flow of the signal, and where continuation of a line in the drawings is not feasible, suitable legends indicate the completed circuit, as in cases where an input to a gate or a flip-flop is identified by the reference character of its source. Similarly, some cables (C-1, C-2, etc.) and lines (L-41, L-42, etc.) are provided with reference characters for convenience of identification from sheet to sheet but which are not referred to in the text.

The several gates represented by triangles and semicircles may each comprise a combination of transistors and resistors to produce the designated function. Without regard to polarity of input or output, all triangles represent the logical NAND function, i.e. if and only if all input polarities are identical, the polarity of the output is the opposite of the polarity of the inputs. Negative logic is employed throughout the logic diagram, with the value 1 being assigned to negative polarity, so that positive polarity becomes 0. Thus each plain triangle will have a negative output when all of its inputs are positive, and it may therefore conveniently be designated as a "plus NAND gate." Conversely, each triangle having a bar along its base will have a positive output when all of its inputs are negative and may therefore be designated as a "minus NAND gate." The diode gates, which appear only in FIG. 15, are AND gates.

The semi-circles in the logic diagram represent the logical NOR function, i.e. if a particular polarity appears as an input, the output is of the opposite polarity. Thus the plain semicircle will have a positive output if any of its inputs is negative, and it may therefore be designated as a "minus NOR gate." Similarly each barred semicircle will have a negative output if any of its inputs is positive, and it may therefore be designated as a "plus NOR gate." Electrically, however, the barred triangles and barred semi-circles may be identical, and similarly the unbarred triangles and unbarred semicircles may be electrically identical. Polarity inverters are also shown by semicircles each having a single input, and they are also designated by reference characters having the prefix "V" for convenience distinguishing from the reference characters for gates, which have the prefix "G".

The flip-flops represented by double squares may comprise combinations of two transistors cross-connected to enable each to affect the other so that one will be "on" while the other is "off" and vice versa. They are stable in either of the two states and may be set or reset in either state by an appropriate signal, or they may be caused to alternate from one state to the other in response to successive signals on a common input line. Thus the latter arrangement is typified by flip-flop FF-5 (FIG. 7), wherein each positive signal on the input line will reverse the polarity of outputs $f5$ and $f5'$, which are the outputs of the upper and lower halves of the flip-flop as viewed in the logic diagram.

The set and reset flip-flop arrangement is typified by flip-flop FF-54 (FIG. 12) where the input line from flip-flop output $f67$ has a bar thereacross to indicate that a positive signal thereon will make output $f54$ positive and output $f54'$ negative. Similarly the unbarred input line L-50 indicates that a negative signal thereon will make output $f54$ positive and output $f54'$ negative. Conversely the unbarred input line to the bottom of flip-flop FF-54 indicates that a negative signal thereon will make output $f54'$ positive and output $f54$ negative. It should also be understood that the term "flip-flop" is used herein as generic to bistable elements which will remain in either of two conditions or states and which can change state or be set to a predetermined state in response to predetermined input signals.

The P.T.O. (power turn on) symbol in conjunction with the barred input to flip-flop FF-53 represents a network which is effective when the power is turned on to issue a positive signal of sufficient time duration to set the associated flip-flop in a predetermined state, namely in this case to make output $f53$ positive and output $f53'$ negative. The same symbol shown as an input to the bottom of flip-flop, as in the case of flip-flop FF-55 (FIG. 15) indicates the converse output result. An input having an "x" thereon, such as flip-flop FF-57 (FIG. 13), represents a negative voltage which holds the associated flip-flop in the desired state irrespective of other inputs thereto.

The wiring diagram does not show the power supply, which consists of the necessary components to produce a bias voltage of +12, a reference point of 0 voltage, a −12 voltage and a −24 voltage, all DC. The −24 voltage is used only to provide extra power for certain components, and references throughout the description to a plus or minus signal or to positive and negative normally mean 0 and −12 volts respectively.

Figure 6:
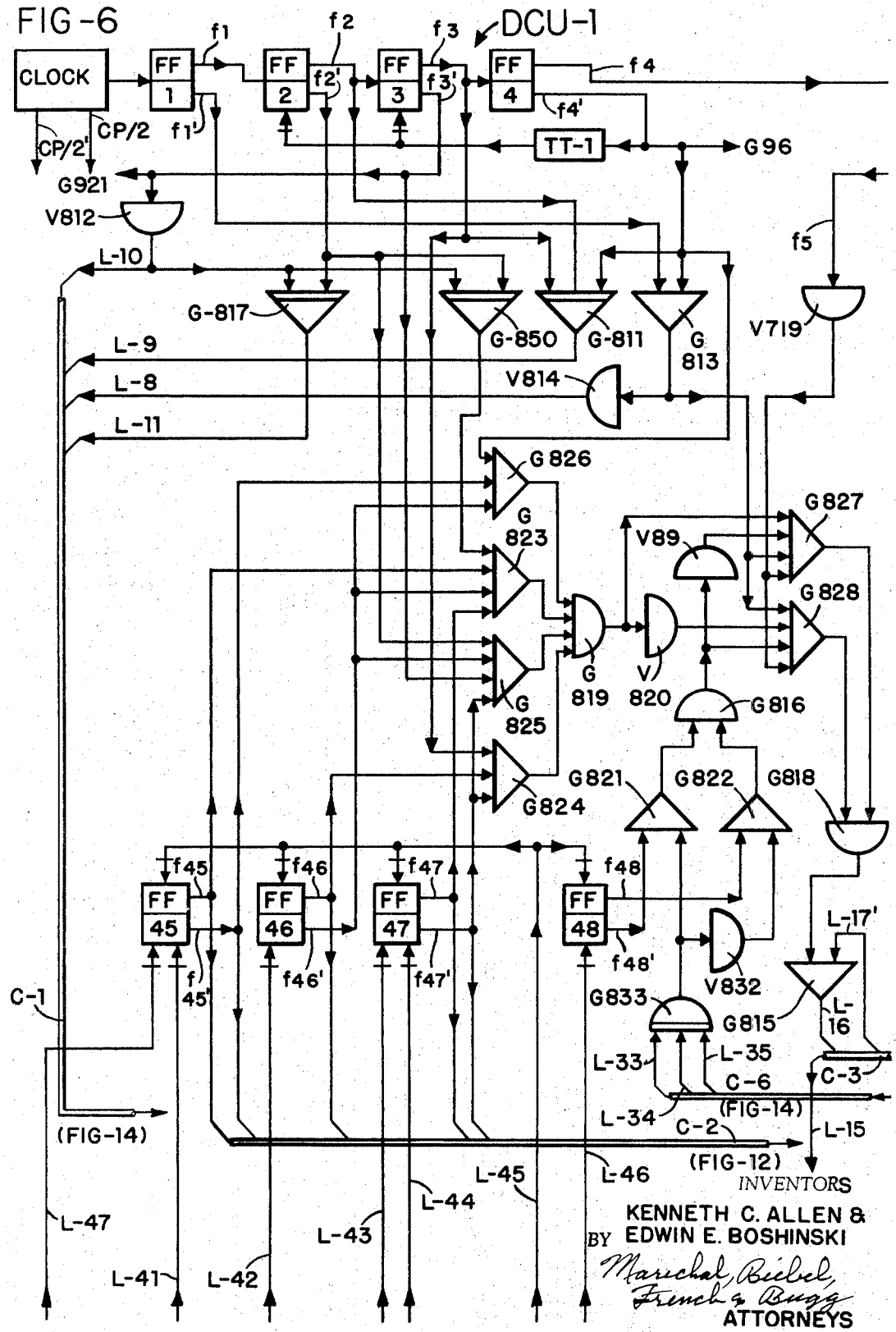

The block identified as "Clock" in the upper left hand corner of FIG. 6 represents a continuous pulse generator having three outputs identified as CP/1, CP/2, and CP/2'. These outputs represent substantially square wave pulses of the order of 12 volts in height operating at a frequency of about 10 kilocycles. Outputs CP/1 and CP/2 are identical in wave shape but are 180° out of phase. Output CP/2' is identical with output CP/2 but of opposite polarity.

Figure 5:
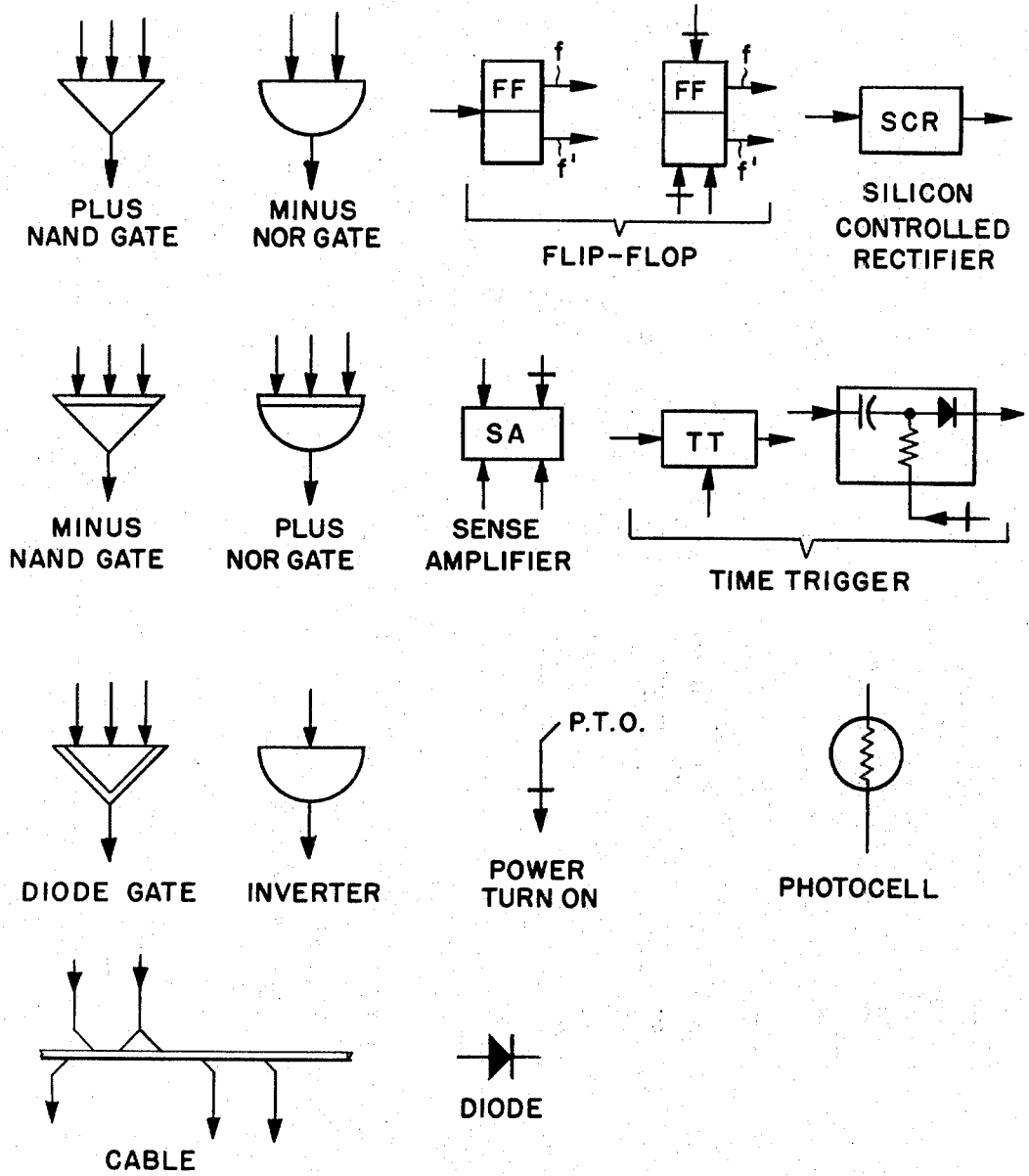
FIG. 5 illustrates some of the electrical symbols employed in the wiring diagram of FIGS. 6–15.

Clock output CP/1 serves as the synchronizing signal for the system and is fed into a series of flip-flops FF-1 through FF-4, which are in series with each other but which are also provided with a feedback circuit from output $f4'$ to flip-flops FF-2 and FF-3. The time trigger network TT-1 in this feed-back circuit is a differentiating network as shown in FIG. 5 such that when output $f4'$ changes from negative to positive, the feed-back circuit transmits a positive pulse of short duration to flip-flops FF-2 and FF-3. Whereever one of these TT units is shown as having only one input, it is assumed that its other input is positive at all times.

Referring again to FIG. 6, each pulse from the clock causes flip-flop FF-1 to switch from one state to the other. As flip-flop FF-1 returns to its original state, it sends a pulse to flip-flop FF-2, which responds to the pulses of flip-flop FF-1 as the latter responds to the pulses of the clock. Flip-flop FF-2 in turn sends its pulses to flip-flop FF-3, and the pulses of flip-flop FF-3 are similarly sent to flip-flop FF-4. Thus each flip-flop becomes a pulse divider, and in the absence of the feed-back circuit, all four flip-flops in the group would be returned to their original condition after every sixteen pulses. The feed-back circuit, however, is so arranged that the four flip-flops as a group are returned to their original state after each series of ten input pulses, and this network accordingly forms a decimal counting unit DCU-1 which is also referred to hereinafter as the first pulse counter.

After every ten pulses, flip-flop FF-4 delivers a signal on its output line $f4$ which leads to a second group of flip-flops FF-5 through FF-8 connected with each other and the time trigger TT-2 in the same manner as the flip-flops of the first pulse counter. This second group of flip-flops therefore constitutes a second decimal counting unit DCU-2, which is also referred to hereinafter as the second pulse counter. The output $f8$ is supplied through time trigger TT-3 and line L-48 to a third group of four flip-flops FF-9 through FF-12 which are connected in series without a feed-back and thus constitute a 16-counter, which is referred to hereinafter as the program counter and functions to program the operations of the entire system.

Figure 10:
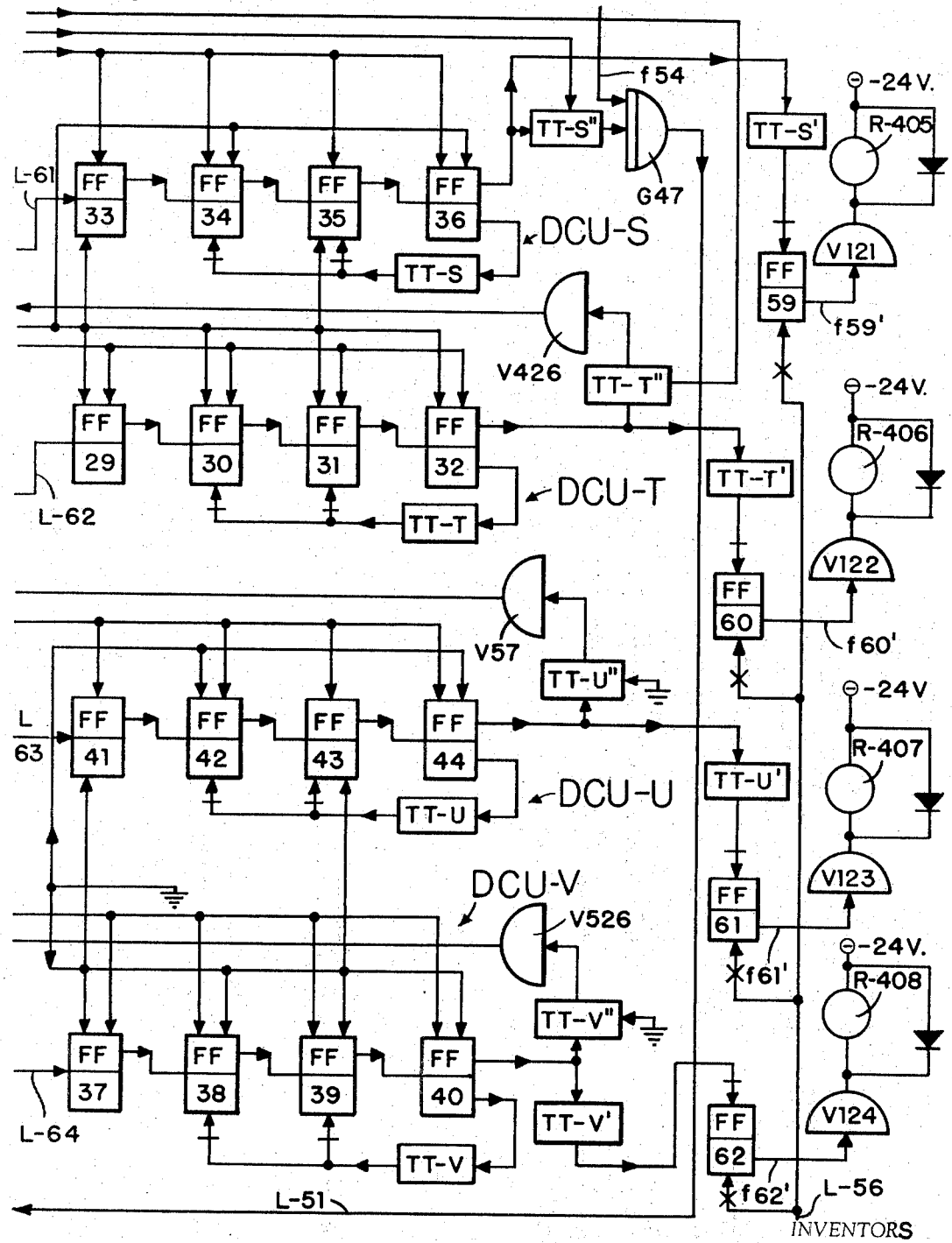

FIGS. 10 and 15 show eight more groups of four flip-flops each connected like those of DCU-1 and DCU-2 and each similarly provided with a feed-back circuit and time trigger to form eight additional decimal counting units. These units constitute storage counters for the respective digits of weight and value, and they are correspondingly identified hereinafter and in the drawings with the letters W, X, Y and Z (DCU-W, et seq.) for the columns of weight as described above and with the letters S, T, U and V for tens of dollars, dollars, dimes and cents respectively.

All of the several decimal counting units and the program counter operate according to the following information:

TABLE V

| DCU | | | | | Program Counter | | | |
|---|---|---|---|---|---|---|---|---|
| I | II | III | IV | | I | II | III | IV |
| + | + | + | + | 0 | + | + | + | + |
| − | + | + | + | 1 | − | + | + | + |
| + | − | + | + | 2 | + | − | + | + |
| − | − | + | + | 3 | − | − | + | + |
| + | + | − | + | 4 | + | + | − | + |
| − | + | − | + | 5 | − | + | − | + |
| + | − | − | + | 6 | + | − | − | + |
| − | − | − | + | 7 | − | − | − | + |
| + | − | − | − | 8 | + | + | + | − |
| − | − | − | − | 9 | − | + | + | − |
| | | | | 10 | + | − | + | − |
| | | | | 11 | − | − | + | − |
| | | | | 12 | + | + | − | − |
| | | | | 13 | − | + | − | − |
| | | | | 14 | + | − | − | − |
| | | | | 15 | − | − | − | − |

In the above tables, columns I, II, III AND IV represent the four flip-flops which comprise any of the counters, and the symbols opposite the count indicate the outputs of the upper part of the double square symbols used for the flip-flops in FIGS. 6-15. In other words, at 0, flip-flops FF-1 to FF-4 have positive outputs $f1$ to $f4$ and negative outputs $f1'$ to $f4'$, and the polarity of each of these outputs is reversed at the count of 9 on all of the counters except the program counters, which requires fifteen counts to reach this condition. Sampling of the state of the various flip-flops in a counting unit accordingly makes it possible to determine the actual state of the count at any time.

Figure 7:
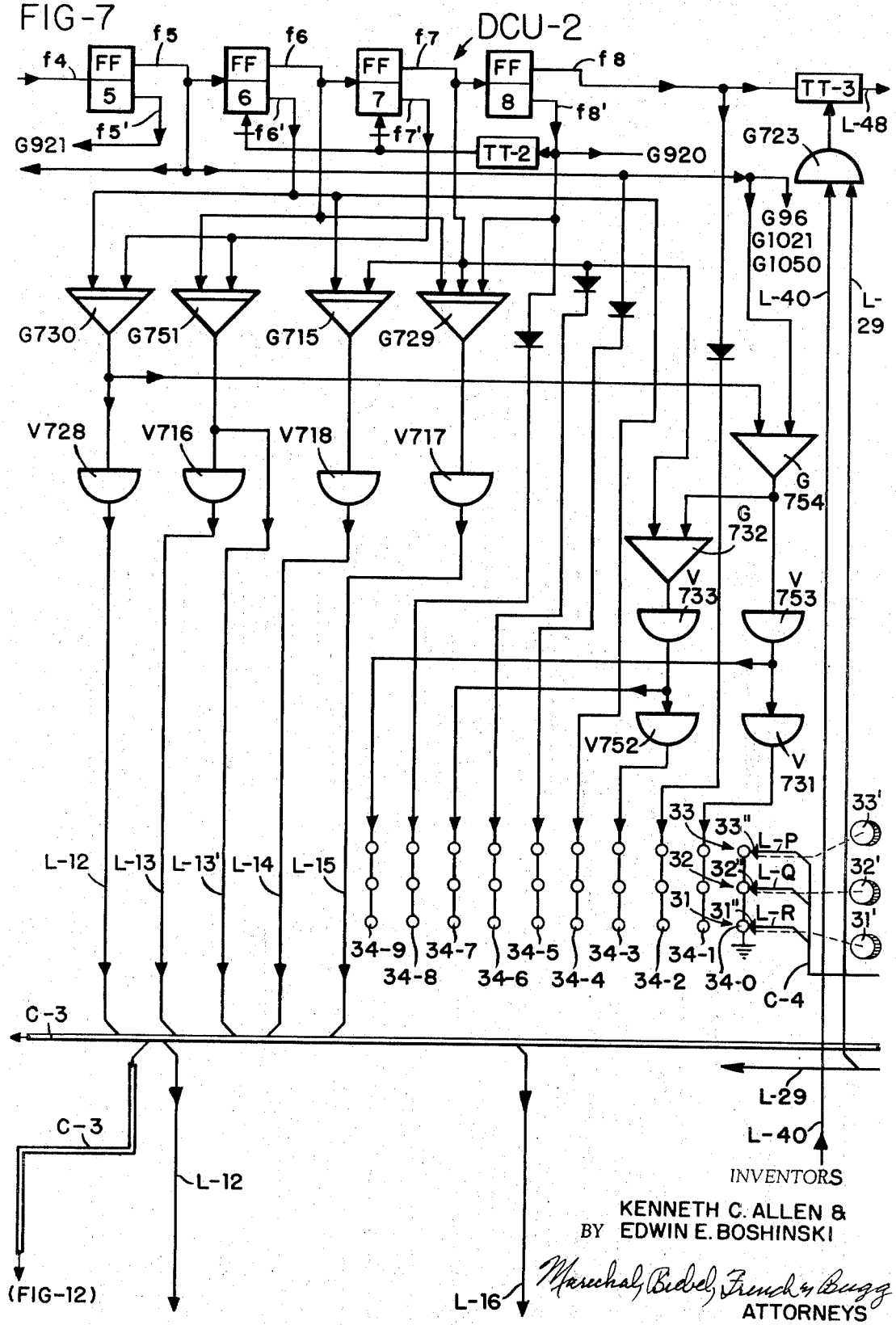
Figure 11:
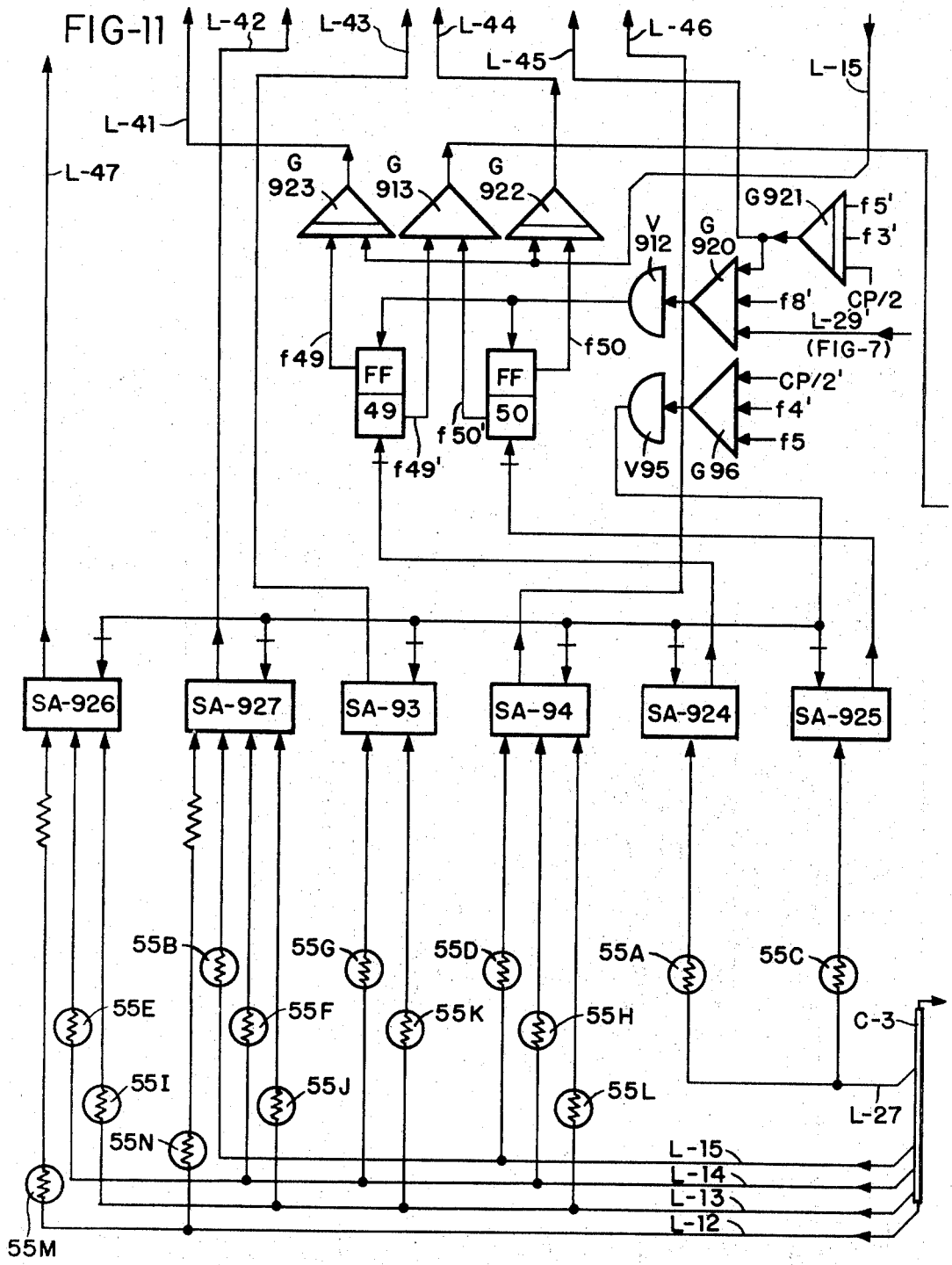

The storage counters DCU-W through DCU-Z temporarily store the respective digits of weight in accordance with the determination by the photocell circuits which read out the weight information at the balance position of the scale and which appear in the portion of the wiring diagram shown on FIG. 11. The unit price digits which constitute the other factor multiplied by the counter are determined by the price knobs 31'33-, which in turn operate switches 31-33 connected with the outputs of counter DCU-2 as shown in FIG. 7. The other details of operation of the system are described in connection with a complete operating cycle wherein it is assumed that the load on the scale was beef weighing 14.96 pounds and having a unit price of $1.26, resulting in a value of $18.85 as shown by the label 40 in FIG. 3.

Figure 3:
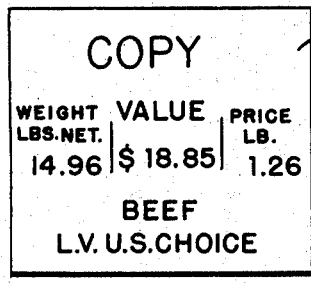
FIG. 3 illustrates a printed ticket of the type issued by the system of FIG. 1.

The computation to produce the label of FIG. 3 as noted above involves literally the following problem in arithmetic:

EXAMPLE I

```
  14.96
   1.26
  ─────
   8976
  2 992
 14 96
 ──────
 18.8496
```

The same problem may also be expressed in terms of the letter symbols already referred to, and which graphically present the operation of the system of the invention as follows:

Example II

```
         W X          Y Z
   P                  Q R
       ─────────    ──────
       R W  R X     R Y R Z
    Q W Q X Q Y        Q Z
 P W P X P Y P Z        5
 ────────────────    ──────
      S T U V          M N
```

The values M and N in the above product represent mills and tenths of mills and are used only temporarily, to generate carries to the penny column V, and they are stored temporarily for this purpose in DCU-S and DCU-T as will be described but are not shown in the final value total. The digit 5 in the M column is arbitrarily added to the mills total so that the final digit in the penny column will be accurate to the nearest half-cent.

A complete cycle of operation involves the use of 1600 pulses from the clock, which also corresponds to a complete cycle of the program counter. In the following description, the home position of the program counter has been selected to be its 1300 position, in which it rests while the computer is not in operation and also during a weighing operation of the scale. When the system is thus at rest, with the power turned on but the scale at zero, it should be noted that each of flip-flops FF-53, FF-54, FF-55, FF-56, FF-58 and FF-59 has been preset to the condition indicated by the P.T.O. symbol therewith, either as a result of having just turned the system on or as a result of a step in the preceding cycle as will be described hereinafter.

When the program counter is in its home position, it will be seen from Table V that flip-flop outputs $f9, f10'$, $f11$ and $f12$ are all negative. These outputs are connected to minus NAND gate G66 (FIG. 8), which with all its inputs negative supplies a positive signal to minus NOR gate G723. At this time, as will be pointed out below, the other input to gate G723 on line L-40 is also positive so that the output of gate G723 is negative. This results in a negative input to time trigger TT-3, which under these conditions functions similarly to a diode gate and gives a positive output only if both of its inputs are positive. Since this is not the case, time trigger TT-3 does not transmit the pulse from output $f8$ to flip-flop FF-9, and the program counter remains in the 1300 position. It should also be noted that whenever the program counter is not in its home position, gate G66 has a negative output which causes gate G723 to allow the pulse from output $f8$ to be transmitted to flip-flop FF-9. This self-sustaining action continues until the program counter reaches its home (1300) position, whereupon it will cease receiving pulses until line L-40 again becomes negative as described hereinafter to start a new cycle.

Whenever the program counter is in its home position, photocells 55A and 55C are periodically checked to determine whether the scale is at balance. These photocells act to detect motion of the scale in a manner similar to that described in detail in Allen application Ser. No. 220,765, filed Aug. 31, 1962. The arrangement is such that whenever the scale is at balance, not more than one of photocells 55A and 55C will be energized, as is apparent from Table IV and the showing in FIG. 4, but whenever the scale is in motion, the effect is as if both were energized simultaneously.

Photocells 55A and 55C have negative voltage continuously applied thereto through line L-27 while the program counter is stopped in its 1300 position. In this counter position, the flip-flop outputs *f*11 and *f*12 are negative, and they are connected through inverters V612 and V613 to plus NAND gate G610 (FIG. 8) so that the output of the latter is negative, and it is this negative voltage which energizes photocells 55A and 55C. Each of these photocells is connected to a sense amplifier SA-924 or SA-925, which may be described as regenerative or feed-back amplifiers each of which is conditioned by the associated photocell and triggered by the clock through inverter V95 in series with plus NAND gate G96, which receives a clock pulse on output CP/2' and also signals from outputs *f*4' and *f*5. This particular combination causes clock pulses 8, 9, 28, 29, 48, 49, 68, 69, 88 and 89 to be delivered to the sense amplifiers during each cycle of counter DCU-2. Thus if either of photocells 55A and 55C should be conductive, the associated sense amplifier delivers pulses to the flip-flops FF-49 and FF-50, causing the latter to give out signals to the three gates directly above them in FIG. 11.

Flip-flops FF-49 and FF-50 are periodically reset in the home position of the program counter so that they can follow the changing conditions of photocells 55A and 55C. For this purpose, signals are delivered periodically by inverter V912 from plus NAND gate G920, which has inputs from gate G66, flip-flop output *f*8', and minus NAND gate G921. The inputs to gate G921 comprise clock pulses from output CP/2' and also signals from flip-flop outputs *f*3' and *f*5', so that gate G921 can deliver clock pulses 0–3, 20–23, 40–43, 60–63 and 80–83 during each cycle of counter DCU-2. The net result of this gating causes gate G920 to deliver only pulses 80, 81, 82, and 83, and it is able to do this only when the program counter is in its home position.

When the scale is in balance at zero and the program counter is in its home position, photocell 55A will become conductive through line L-27, as shown by FIG. 4, and will cause sense amplifier SA-924 to transmit a positive signal to flip-flop FF-49. This will in turn cause flip-flop output *f*49' to transmit a positive signal to plus NAND gate G913, but since the outer input to gate G913 from output *f*50' is negative at this time, because photocell 55C is non-conductive, the output of gate G913 will be positive. The resulting signal is transmitted to plus NAND gate G1019, and the same signal reaches gate G1019 an instant later after passage through the time delay network TD-1. The output of gate G1019 will remain positive, however, due to negative signals which it receives from other sources while the scale remains at zero, as now described.

Whenever the scale is at balance with the program counter in its home position, the flip-flops associated with photocells 55M and 55N are also periodically reset and checked to determine whether the balance position of the scale is within a weight range which will produce automatic computing. Referring particularly to FIGS. 7 and 11, the energizing line L-12 for photocells 55M and 55N leads through inverter V728 from minus NAND gate G730 which has inputs from flip-flop outputs *f*6' and *f*7'. Accordingly, whenever both of these inputs are negative in accordance with Table V, which will be when counter DCU-2 is in its 0 and 10 positions, photocells 55M and 55N are read out to determine their state, whether conductive or non-conductive.

In the zero position of the scale, neither of photocells 55M and 55N is conductive, as already described. As a result, their associated sense amplifiers SA-926 and SA-927 are non-conductive, and their associated flip-flop outputs *f*45 and *f*46 are positive, due to the periodic resetting signals to flip-flops FF-45 and FF-46 from gate G921. Outputs *f*45 and *f*46 both form inputs to plus NAND gate G1020, (FIG. 12) which also has an input from flip-flop output *f*47. Output *f*47 is positive at this time, since its associated photocells 55C, 55G and 55K are not energized, so that periodically all of the inputs to gate G1020 are positive and thus cause its output to become negative.

When gate G1020 is caused to emit a negative signal as just described, this signal goes to minus NAND gate G1021, and when the other inputs to gate G1021 from line L-12 and output *f*5 are also both negative, which will be in the 10 position of counter DCU-2, the resulting positive signal is transmitted to flip-flop FF-53 and causes its output *f*53 to be similarly positive. The positive signal from output *f*53 is one of the inputs to minus NOR gate G1024, the other input to which is also positive, since it is shorted to ground through the normally closed manual start switch 72. The output of gate G1024 is therefore negative, and it forms an input to plus NAND gate G1019. The fourth input to gate G1019 is from flip-flop output *f*56, which at this time is positive, for reasons described hereinafter. It follows, therefore, that it is the negative input to gate G1019 resulting from the non-conductivity of both of photocells 55M and 55N which holds the system from automatically starting a computing cycle while the scale is in balance at zero.

When a load is placed on the scale and causes it to start in motion, the state of photocells 55A and 55C immediately changes, and both are energized in alternating succession. Their associated flip-flops FF-49 and FF-50 are therefore set to transmit simultaneous positive inputs to plus NAND gate G913, changing its output to negative and thereby preventing gate G1019 from emitting a negative signal irrespective of the condition of photocells 55M and 55N. In addition, since one or both of photocells 55M and 55N will now also be energized as soon as the scale moves above .10 pound, causing one or both of flip-flops FF-45 and FF-46 to transmit negative signals to gate G1020, the output of gate G1021 will be negative, and this will permit the signal to flip-flop FF-53 from gate G913 through time delay TD-1 to reset it and cause its output f53 to become negative. The resulting negative input to gate G1024 causes its output signal to gate G1019 to become positive, but this does not change the output of gate G1019 because of the negative inputs thereto from gate G913 so long as the scale is in motion.

When the scale comes to balance with a load of 14.96 pounds on the platter as previously assumed, the first result is that photocell 55A will cease conducting, while photocell 55C remains in a conductive state. The output of gate G913 will accordingly change and transmit a positive signal to gate G1019. The same positive signal will reach gate G1019 a predetermined time interval later through the time delay network TD-1, which establishes that the scale is truly at balance, rather than being temporarily still as while reversing its direction of motion. It should be noted that the same conditions will exist if the weight should be such that neither of photocells 55A and 55C is energized, which Table IV shows will occur if the last digit is 2 or 7. In such event, outputs *f*49 and *f*50 will both be negative, but since gate G913 is a plus NAND gate, its output will be positive.

At this time, photocells 55M and 55N will both be energized, because of the 1 in the tens of pounds column, and since negative signals are therefore transmitted from flip-flop outputs *f*45 and *f*46 to plus NAND gate G1020, flip-flop FF-53 will remain in the condition to which it was set by the signal of scale motion from gate G913. Since the condition of flip-flop FF-56 has not been changed, its signal to gate G1019 is still plus, all of the inputs to gate G1019 will be plus, and it will transmit a negative signal on line L-40. At this time also, flip-flop FF-58 will have been set to deliver a negative signal on its output *f*58', which connects with line L-40, due either to the operation of its associated P.T.O. when the scale is first turned on, or to the temporary opening and closing of mechanical switch 80 in the preceding cycle as previously noted. Accordingly, the desired negative signal will be transmitted on line L-40 from gate G1019 to gate G723, causing its output to time trigger TT-3 to become positive and enabling the latter to transmit a positive signal on line L-48 to flip-flop FF-9 the next time that flip-flop output *f*8 changes from negative to positive.

Delivery of a positive signal as just described to flip-flop FF-9 marks the start of a complete computer cycle. The first step in the cycle is that the program counter will advance to its 1400 position and cause four positive signals and an input from clock output CP/2 to be delivered to plus NAND gate G619. The resulting negative signal from gate G619 is amplified by the emitter follower amplifier EF-1 and becomes the reset signal for a plurality of stations in the system.

Referring to FIG. 12, the reset signal is transmitted by line L-50 to flip-flop FF-53 to set it to the condition in which its output *f*53 delivers a positive signal to minus NOR gate G1024 and thus prevents a second start of the system. Similarly, the reset signal is transmitted to flip-flop FF-54 to reverse its state to a condition wherein its output *f*54' is positive, which is a prerequisite to printing a ticket as described hereinafter.

Figure 9:
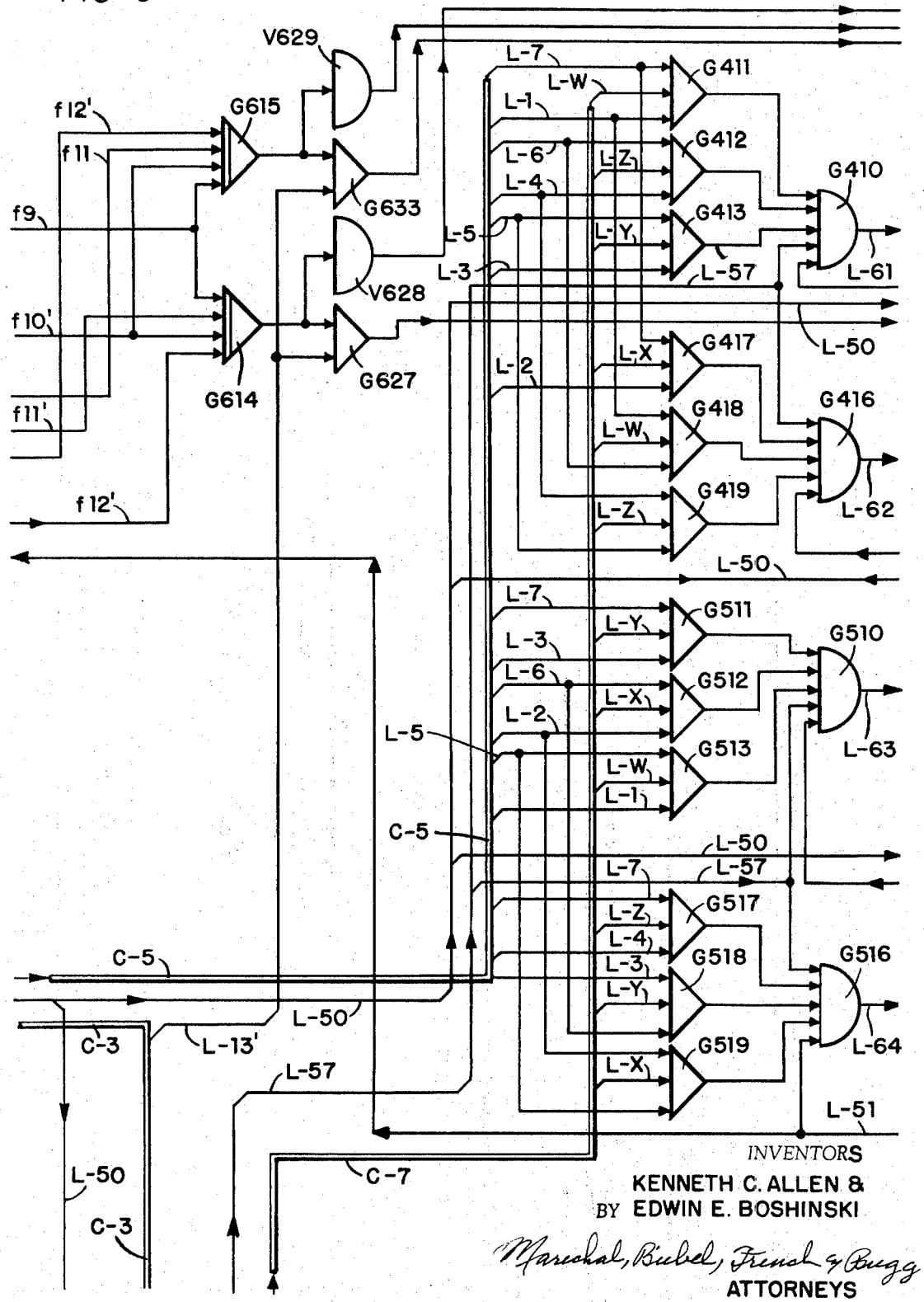

The reset signal on line L-50 is also transmitted as shown in FIGS. 9 and 14 to the several counters which store the digits of weight and value for the purpose of resetting them to their respective starting positions. These starting positions will be zero for all of the counters except DCU-S, which temporarily represents the value M in computing and is accordingly reset to 5 in order to add five mills in the M column as previously noted. As shown in FIGS. 9 and 10, this resetting signal for DCU-S causes flip-flop outputs *f*33', *f*34, *f*35' and *f*36 to be positive.

As the count progresses through resetting, the program counter moves to its 1500 position in which it causes read-out of the weight to begin. At this point, four negative signals are delivered to minus NAND gate G69, which also has an input from clock output CP/2' and will in turn deliver positive pulses to line L-17', and these pulses, which correspond to clock output CP/2, is delivered to plus NAND gate G815 (FIG. 6) throughout the count from 1500 to 1599. The advance of the program counter into this position occurred on the 1500th pulse, and during the count from 1500 to 1519, a negative signal will be delivered to line L-12 through inverter V728 from minus NAND gate G730, which will at this time be receiving two negative signals from counter DCU-2. In addition, during the count 1500–1503, flip-flops FF-45 through FF-48 will be reset through gate G921 as previously described.

The negative signals from inverter V728 will energize photocells 55M and 55N, and they in turn will saturate their associated sense amplifiers, which will be triggered on the counts of 1508 and 1509 through inverter V95 and gate G96 as previously described. These signals in turn will set flip-flops FF-45 and FF-46 to produce positive signals on their outputs *f*45' and *f*46', which will deliver positive signals to two of the input lines to plus NAND gate G826 (FIG. 6). The third input to this gate is connected to flip-flop output *f*4' which will be positive only on the 8th and 9th counts of counter DCU-1.

Thus during these two counts, a negative signal will be delivered to minus NOR gate G819, which in turn will deliver a positive signal to plus NAND gate G827, but the same signal will be inverted by inverter V820 and delivered as a negative input during these two counts to plus NAND gate G828. One of the inputs to gates G827 and G828 is a signal from plus NAND gate G813 which is positive on every count except 9. Another input to these two gates G827 and G828 comes from inverter V719 (FIG. 6), which is so connected to counter DCU-2 as shown that its output is positive on counts 10–19, 30–39, 50–59, 70–79 and 90–99. The fourth input to gate G827 comes from inverter V89, and for reasons to be described, this input to gate G827 will be plus at this time.

This combination of inputs to gate G827 will be such that its output will be negative on the 18th count only. This negative signal is then inverted as it goes through NOR gate G818 to plus NAND gate G815, which is also receiving positive clock pulses from gate G69 as already described, so that during this time interval of a single count, one negative clock pulse CP/2' is delivered on line L-16 to diode gate DG-W. This diode gate, which is an AND gate, is also receiving a negative signal from line L-12, which as previously described continues negative through the counts 0–19, so that both of the inputs to gate DG-W will be negative during the clock pulse occurring during the interval between the start of pulse 18 and the start of pulse 19. This one pulse will accordingly be delivered through gate DG-W to minus NOR gate G323 and into the counter DCU-W and thereby register there the digit 1 of the assumed weight value of 14.96.

As the second decimal counter DCU-2 proceeds through its range of 20 to 39, line L-13 will be negative in response to the output of minus NAND gate G751 through inverter V716, and this will energize photocells 55I, 55J, 55K and 55L. During the count from 20 to 23, the inputs to minus NAND gate G921 from flip-flop outputs *f*3' and *f*5' and the clock output CP/2' cause gate G921 to deliver a positive reset signal to flip-flops FF-45 through FF-48, which returns them to their original state and in effect erases from them the M and N information which has now been stored in counter DCU-W. Then on the counts of 28 and 29, the energized photocells which have become conductive will be read-out as now described.

Referring to the preceding explanation of the reflected biquinary code, at the assumed weight of 14.96 pounds, the first digit is odd, and this means that the next digit to be read is actually the 9's complement (5) of the true digit (4). Reference to Table IV shows that the photocells which therefore become conductive are 55K and 55L, and when their associated sense amplifiers SA-93 and SA-94 are triggered on the counts of 28 and 29, they will cause flip-flops FF-47 and FF-48 to be set to deliver positive signals on their outputs $f47'$ and $f48'$.

Output $f47'$ therefore delivers a positive signal to plus NAND gate G824, which at the same time receives a positive signal from output $f46$. This gate G824 has a third input from flip-flop output $f3$, which is positive on the counts of 0–3, 10–13, etc., so that during each such sequence of four pulses 0–3, the output from gate G824 will be negative, and the output from NOR gate G819 will be positive during the same counts 0–3. The significance of these facts will become apparent hereinafter.

The use of the reflected biquinary code requires a signal from plus NOR gate G833 to indicate whether the previously read digit was odd or even, an even digit being represented by a negative signal from gate G833. In the present example, the previously read digit stored in counter DCU-W was the odd digit 1 which causes flip-flop output $f25$ to deliver a negative signal to minus NAND gate G332 (FIG. 14). This gate is also receiving a negative signal on line L-13 during the count from 20 to 39, and gate G332 will accordingly deliver a positive signal to line L-35 which will result in a negative signal delivered by gate G833 to plus NAND gate G821 and inverter V832.

The negative signal to inverter V832 will be converted to a positive signal delivered to plus NAND gate G822. At this time, output $f48$ will be negative and output $f48'$ will be positive, so that both of plus NAND gates G821 and G822 will have one positive input and one negative input, their outputs will both be positive, and thus the output from minus NOR gate G816 will be negative. This negative signal will prevent a negative output through plus NAND gate G828 but will be inverted by inverter V89 so as to apply a positive input to plus NAND gate G827. It will at this point also become apparent that since none of lines L-13, L-14 and L-15 were negative during the read-out of the previous digit, all inputs to gate G833 were negative, and this resulted in a positive output from gate G833. Since output $f48'$ was negative and the input to gate G822 from inverter V833 was negative, the output of gate G821 was positive, and this in turn produced the positive input from inverter V89 to gate G827 previously described.

As previously noted, gate G824 will have a negative output during the count of 30–33, and this will produce a positive output during the same four counts from minus NOR gate G819 to gate G827. In addition, gate G827 will have the positive input just described from inverter V89, a positive input from NAND gate G813, during the period of nine counts from 1530 to 1538, and a positive input from inverter V719 during the period of ten counts from 1530 to 1539. As described in connection with the read-out of the first digit, therefore, this will result in application of four negative pulses on line L-16 to diode gate DG-X during the count from 1530 to 1533. This diode (AND) gate is simultaneously receiving negative signals from line L-13 during the count from 1520 to 1539, and so it will be conductive during the four clock pulses 1530–1533 from output CP/2'. Gate DG-X will thus deliver four pulses to minus NOR gate G316, and the count of 4 will be stored in the four flip-flops FF-21 to FF-24 which constitute counter DCU-X.

The read-out and storage of the third digit is carried out as counter DCU-2 proceeds from 40 to 59 and the program counter is at 1500. At this time, line L-14 is energized by NAND gate G715 through inverter V718 to apply power to photocells 55E, 55F, 55G and 55H, and the same line transmits negative signals during this same period to diode gate DG-Y. As in the previous read-out, during the counts from 40 to 43, flip-flops FF-45 through FF-48 will be reset through gate G921, and on the counts of 48 and 49, the photocells in the energized group which have become conductive will be read-out. Since the preceding digit 4 was even, the true digit (9) in the Y column will be read, and Table IV shows that this will cause photocells 55E and 55H to become conductive to set flip-flops FF-45 and FF-48 to deliver positive signals on their outputs $f45'$ and $f48'$.

The resulting $f45'$ positive output will be delivered to plus NAND gate G826, but this gate will also be receiving a negative signal from output $f46'$ so that neither gate G826 nor any of plus NAND gates G823 to G825 will be conductive. Minus NOR gate G819 will therefore not receive a negative signal throughout the count of 40–59, and its output will be negative during all these counts. Since the number stored in counter DCU-X is even, the signal on line L-34 will be negative, and the output of gate G833 will be positive. This positive signal is delivered to plus NAND gate G821, which simultaneously will be receiving a positive signal from output $f48'$.

The two positive inputs to gate G821 will deliver a negative output to minus NOR gate G816, which in turn delivers a positive output to plus NAND gate G828 and through the inverter V89 will deliver a negative input to plus NAND gate G827, thereby blocking its output from becoming negative irrespective of its other inputs. Since the output from NOR gate G819 is negative during this entire group of counts, inverter V820 will deliver a positive signal to plus NAND gate G828. This gate will receive positive signals from inverter V719 during the period from 50 to 59, and it will also receive a positive signal from NAND gate G813 during the nine counts from 50 to 58. Thus gate G828 will produce negative signals on line L-16 through gates G818 and G815 to the diode gate DG-Y throughout these nine pulses, and as previously described for counters DCU-W and DCU-X, these nine pulses will be delivered to DCU-Y to store the digit 9 therein.

As counter DCU-2 proceeds from 60 to 79, the digit 6 will be read-out and stored in counter DCU-Z. During this interval, line L-15 is energized by minus NAND gate G729 through inverter V717 to apply negative power to diode gate DG-Z and to photocells 55B and 55D. Photocells 55A and 55C are continuously energized throughout the read-out period, but at this time the negative power from line L-15 is also applied to minus NAND gates G922 and G923 to effect transmission of the information represented by the conditions of photocells 55A and 55C to flip-flops FF-45 and FF-47.

The same reset sequence now takes place as previously described, and in this example, since the preceding higher order digit is odd, the number to be read from the chart will be the 9's complement of the digit 6, namely 3, and this will result in making photocells 55B and 55C conductive to set flip-flops FF-46 and FF-47 and cause them to deliver positive signals to plus NAND gate G825. This gate receives positive signals from flip-flop FF-2 on the counts of 2, 3, 6, 7, 8 and 9, and positive signals from flip-flop FF-3 on the counts of 4, 5, 6, 7, 8 and 9. This gate can thus emit a negative signal only on counts 6, 7, 8 and 9, and since the 9th count is always cancelled by NAND gate G813 as previously described, the net result is that gate G825 emits negative signals which are effective only during the three counts 6, 7 and 8.

Since the previous number 9 was odd, there will be a positive signal on line L-33 which will result in a positive input to plus NAND gate G822. Since the state of flip-flop FF-48 was not changed by a conductive photocell, its output $f48$ is positive, and gate G822 will put out a negative signal to minus NOR gate G816 which in turn will apply a positive signal to plus NAND gate G828. This gate will also be receiving a positive signal from inverter V820 during the period of time that the output of NAND gate G825 is positive, that is during the total of six counts 0, 1, 2, 3, 4 and 5. These signals will be delivered through gates G818 and G815 to the diode gate DG-Z, which in turn will deliver six pulses to the DCU-Z and store the number 6 therein.

It will thus be seen that the entire operation of read-out and storage of the weight digits occupies a period of only 80 pulses, namely 8 milliseconds, and this is so short an interval that it is not necessary to hold the scale against movement. At this time, provision is made for preventing an erroneous weight record as a result of movement of the scale. Thus although the read-out involves successive energizing of different groups of photocells, power is supplied continuously to photocells 55A and 55C throughout the read-out period. If any motion of the scale should occur before the read-out is completed, the resulting negative signal from gate G913 will reset flip-flop FF-53 to the position in which it will prevent operation of the printer as will be described hereinafter.

It should also be noted that photocells 55A, 55B and 55C are utilized to detect whether the actuating lamp 50 for the photocells is lighted, and to cause a signal to be given if lamp 50 should be out. Referring to FIG. 12, minus NAND gate G1050 receives inputs from flip-flop output $f5$, gate G1020 and line L-15, together with an input from flip-flop output $f67$ which is negative at this time for reasons to be described. As shown by Table IV, at least one of photocells 55A, 55B and 55C must be energized during the read-out of the Z column, which will result in a positive output from gate G1020 during the count from 70 to 79 while output $f5$ is negative. If, however, light 40 is out, all of the outputs $f45$, $f46$ and $f47$ will be positive, the output of gate G1020 will be negative, and gate G1050 will transmit a positive signal to flip-flop FF-55 causing its output $f55'$ to be negative. This output will be changed to positive through inverter V117 and causes to light the error light 60, and the same positive signal will reset flip-flop FF-54 to the state in which it prevents printing as will be described hereinafter.

The operation of flip-flop FF-67 referred to in the preceding paragraph is related to the tare adjustment knob 23 and associated signal light 24. More specifically, the circuits are arranged to cause light 24 to be lighted when the power is first turned on, so that the operator is advised to give attention to the proper setting of the tare. Referring to FIG. 13, flip-flop FF-67 is provided with a P.T.O connection, which causes its output $f67$ to be positive when the scale is first turned on, and this positive signal is caused to light the tare signal light 24.

The light 24 calls to the operator's attention that the tare may require adjustment, but such adjustment is frequently not actually necessary. Accordingly, in order to make it possible to extinguish light 24 without physically changing the tare adjustment unnecessarily, the adjusting knob 23 is made of metal and connected with flip-flop FF-67 through an oscillator TSA to form therewith a touch control unit.

The oscillator TSA may comprise a de-tuned oscillator or similar device which is excited or triggered into a state of oscillation by bodily contact on the part of the operator with the knob 23, so that it is necessary only for the operator to touch the knob without other physical manipulation thereof, and this will cause the associated oscillator TSA to transmit a positive resetting signal to flip-flop FF-67, which will extinguish light 24 by changing to negative the signal from output $f67$. It should also be noted that if operation of the scale and computer is attempted without extinguishing light 24, an error condition will result, as is described hereinafter.

The initial setting and resetting of flip-flop FF-67 as just described is also employed to prevent a false signal from gate G1050 when the scale is first turned on. Since the photocells and lamp 50 require a time interval to become effective, it would be initially possible for all of photocells 55A, 55B and 55C to appear dark and thereby to cause gate G1050 to emit a positive signal. It is for this reason that output $f67$ is used as an input to gate G1050, since it will be positive when the scale is first turned on, and the interval required to change it to negative by actuation of the tare adjustment knob will provide a sufficient time interval for the photocells and lamp 50 to become effective if lamp 50 is operative.

Computation begins when the program counter reaches its 1600 (0000) position, and it follows essentially the sequence illustrated in the preceding Example II. As previously noted, the price digits comprising the values P, Q and R are set by the switches 31–33, which cooperate with counter DCU-2 and associated gates so that the nine contacts 34 carry negative signals during different parts of a complete cycle of counter DCU-2, as now described.

The contact 34-1 is negative only when inverter V731 receives a negative signal from plus NAND GATE G754 through inverter V753, as a result of positive signals to gate G754 from output $f5$ and from outputs $f6'$ and $f7'$ through minus NAND gate G730. Table V shows that this condition occurs only in the 0 position of counter DCU-2. FIG. 7 also shows that inverter V753 has a negative output in all remaining nine positions of the counter which is supplied to contact 34-9. Similarly contact 34-2 receives a negative signal from output $f8$ during positions 8 and 9 of counter DCU-2, and in its remaining eight positions, the negative signal from output $f8'$ is supplied to contact 34-8, and so forth.

In the present example of $1.26 per pound, P switch 33 is set on contact 34-1, Q switch 32 is set on contact 34-2, and R switch 31 is set on contact 34-6. These contacts cooperate with the program counter and with the weight storage counters to effect selective transmission of pulses to the value storage counters DCU-S through DCU-V. As shown in Example II, the computation involves twelve separate multiplications or partial products, and these multiplications are effected during successive counts of 100 as the program counter moves from its 0000 position through its 1100 position.

Figure 8:
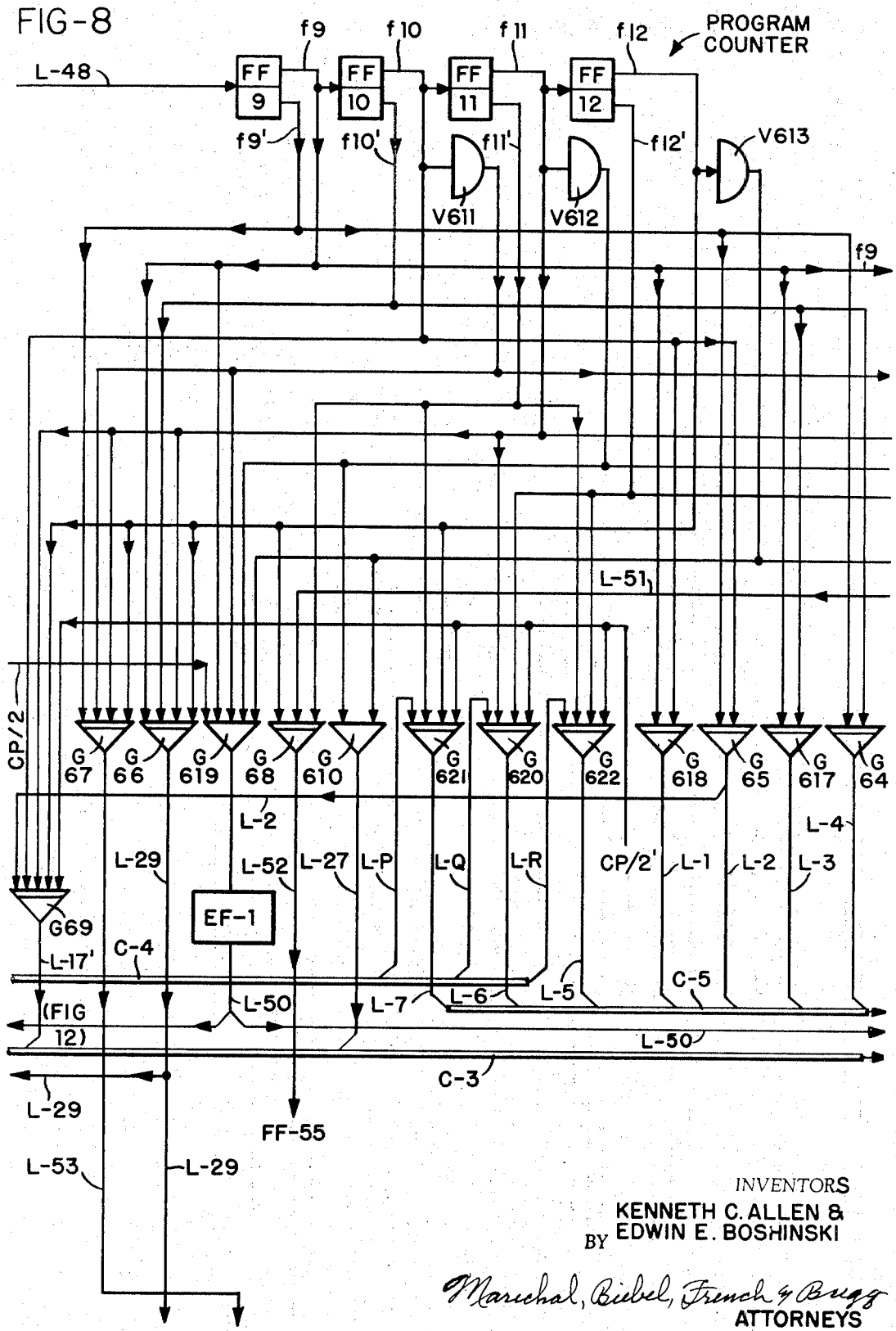

Referring particularly to FIG. 8, the minus NAND gate G622 is so connected with outputs $f11'$ and $f12'$ that it is capable of producing a positive signal on its output line L-5 from count 000 through count 399, depending upon its other two inputs, which are from clock output $CP/2'$ and line L-R from R switch 33. Similarly minus NAND gate G64 is so connected with outputs $f9'$ and $f10'$ that it is capable of producing a positive signal on its output line L-4 when the program counter is in any of its 000, 400, 800 or 1200 positions.

The multiplication RZ is carried out during the 100 pulses while the program counter is in its 000 position, during which interval, both of gates G622 and G64 are capable of producing a positive output as just noted. Since the R digit is 6, line L-R is negative while counter DCU-2 moves from 40 through 90, and during this interval, positive signals from both of gates G622 and G64 will be delivered by lines L-5 and L-4 to plus NAND gate G419 (FIG. 9). During this same interval, gate G419 will also receive positive signals on line L-Z in accordance with the weight factor digit stored in counter DCU-Z as now explained.

Since the Z digit in this example was 6, flip-flops FF-14 and FF-15 have been set with their outputs $f14'$ and $f15'$ positive, and these outputs form inputs to plus NAND gates G24 and G23 (FIG. 15) respectively. Positive signals are also delivered to these gates from counter DCU-1, on counts 0, 1, 2 and 3 to gate G23 and counts 6 and 7 to gate G24, and the outputs of these gates are transmitted through minus NOR gate G25 to gate G419. The result of this combination of conditions is that six clock pulses will be delivered through gate G419 and minus NOR gate G416 to the flip-flops of counter DCU-T while counter DCU-2 is in each of its 40 to 90 positions. This will be a total of thirty-six pulses, which constitutes the product of Z multiplied by R, so that by the time the program counter has reached its 100 position, the digit 6 will have been stored in counter DCU-T, and the carry digit 3 will have been carried forward from flip-flop output $f32$ through the time trigger TT-T'', inverter V426 and NOR gate G410 to the four flip-flops constituting counter DCU-S. Since as previously noted, counter DCU-S had been temporarily reset to its 5 position, it will therefore now have a temporary storage value of 8. The carry pulses to counter DCU-S do not, however, affect flip-flop FF-60, because it has a negative holding voltage applied thereto from flip-flop output $f56'$, as noted in more detail hereinafter.

The multiplication RY is carried out while the program counter is in its 100 position. During this interval, gate G622 remains capable of transmitting positive signals as before, but the negative signals are no longer applied to gate G64 and instead are applied to minus NAND gate G617, which is so connected as to become capable of a positive output when the program counter is in its 100, 500, 900 and 1300 positions. Accordingly, while counter DCU-2 moves from 40 through 90, gates G622 and G617 will deliver positive signals on lines L-5 and L-3 to plus NAND gate G413, which is also connected to receive signals from counter DCU-Y on line L-Y.

Since the Y digit in this example was 9, all of the flip-flops in counter DCU-Y will have been set with positive outputs $f17'$, $f18'$, $f19'$ and $f20'$, and the associated gates G226 to G230 (FIG. 15) will accordingly cooperate to cause nine clock pulses to be delivered through gate G413 and minus NOR gate G410 to the flip-flops of counter DCU-S while counter DCU-2 is in each of its 40 to 90 positions. Since this will be a total of fifty-four pulses, counter DCU-S will store the digit 2, namely the second digit 4 of 54 added to the carry digit "8" from the previous multiplication, and the carry digit 6 will be forwarded to counter DCU-V through flip-flop output $f36$, time trigger TT-S'', NOR gate G47 and NOR gate G516.

The second digit of the partial product of RZ is not used, as is apparent from Example II, and also it is necessary to reuse counter DCU-T almost immediately, to store the digits which will actually constitute the value T. Counter DCU-T is accordingly reset back to zero while the program counter is in its 100 position, by a positive output from NAND gate G614 (FIG. 8) which is applied to plus NAND gate G627 (FIG. 9), the other input to which is a signal on line L-13' from NAND gate G751 (FIG. 7), which is positive in the 20 and 30 positions of counter DCU-2. The resulting negative signal from gate G627 resets counter DCU-T back to zero while the overall count is in the range of 120-139.

Resetting of counter DCU-T as just described could result in generating a false carry signal to counter DCU-S unless such signal is suppressed. Accordingly, the positive output of gate G614 is transmitted through inverter V628 and applied as a negative signal to the time trigger TT-T'' during the entire interval while the program counter is in its 100 position. This negative signal prevents transmission of a signal through time trigger TT-T'' and thus blocks the false carry signal which could otherwise occur.

The multiplication RX takes place while the program counter is in its 200 position, at which time gate G622 remains active, but the function of gate G64 is taken over by minus NAND gate G65, which is connected to be capable of a positive output in the 200, 600, 1000 and 1400 positions of the program counter. Gates G65 and G622 accordingly both deliver positive signals to plus NAND gate G519 (FIG. 9), which will also receive positive signals from counter DCU-X through minus NOR gate G35 on the basic counts of 0-3, since the counter was previously set to the digit 4. The resulting total of 24 pulses will be delivered through gate G519 and NOR gate G516 to the flip-flops of counter DCU-V, and this will result in aggregate storage of the digit 0 and a carry digit of 3 forwarded to counter DCU-U through the time trigger TT-V''', inverter V526 and gate G510 as shown in FIG. 10.

The final multiplication by the R factor to produce the partial product RW is carried out while the program counter is in its 300 position. Gate G622 is still active, i.e. capable of a positive output, but in place of gate G65, minus NAND gate G618 is connected to become similarly active in the 300, 700, 1100 and 1500 positions of the program counter. Gates G618 and G622 will therefore both deliver positive signals to plus NAND gate G513 (FIG. 10) which is also connected to receive signals on line L-W from counter DCU-W through minus NOR gate G328 (FIG. 15). Since the W value in the assumed example is 1, a single pulse will be transmitted through gate G513 to NOR gate G510 in each of the 40 to 90 positions of counter DCU-2, and this will occur each time the basic count has the value of 9. The resulting total of six pulses will be combined with the carry digit 3 from the previous multiplication to give a stored product of 9 in counter DCU-U.

The same sequence of operations will now follow for the four multiplications by the Q factor, namely, the digit 2 in this example. Thus as the program counter reaches its 400 position, the negative signals to NAND gate G622 are removed, and minus NAND gate G620 becomes capable of emitting positive signals during the 400 to 700 positions of the program counter, but since the Q digit is 2, gate G620 will actually emit positive signals only in the 80 and 90 positions of counter DCU-2. In the first multiplication QZ, minus NAND gate G64 will again be made active by the application of negative signals, and in each of the 80 and 90 positions of counter DCU-2, the signals to plus NAND gate G412 on line L-Z will permit six pulses to be delivered to NOR gate G410 and counter DCU-S, providing an aggregate stored digit or 4 and a carry digit of 1 to counter DCU-V in the same manner as previously described.

The QY multiplication is carried out with the program counter in its 500 position, and it is believed that the sequence of individual operations will now be apparent without the necessity of detailed explanation. It should be noted, however, that when the program counter reaches its 500 position, there is no longer any necessity for the M information which had been temporarily stored in counter DCU-S, and this counter is now reset to zero in readiness to receive the actual S information. The resetting signal is provided by minus NAND gate G615 (FIG. 9), which remains active while the program counter is in its 500 position and transmits the resetting signal through plus NAND gate G633 to flip-flops FF-33 to FF-36 as shown in FIGS. 9–10 while the overall count is in the range 520–539. In addition, the positive signal from gate G615 is changed to negative by inverter V629 and applied to time trigger TT-S'' to block transmission of a false carry signal to counter DCU-V in the same manner as previously described in connection with the setting of counter DCU-T.

When all four multiplications by the Q digits have been performed, it will be seen that counters DCU-T to DCU-V will have combined the preceding eight multiplications into a storage figure of "389, " since the digits which constituted the M and N values have been discarded, and counter DCU-S will still register zero becuase there was no carry digit thereto from any previous partial product multiplication. The remaining four multiplications by the P digit are carried out as the program counter moves through its 800-1100 positions, and the partial products 6, 9, 4 and 1 will be produced in that sequence and combined with the previously stored digits to produce the final value figure of 1885. It should be noted also that provision is made during computation for detecting whether the value total will exceed the capacity of the printer, as now described.

The illustrated printer has a maximum value capacity of $99.99. During the last four multiplying operations of the computer, by the P digit, the minus NAND gate G68 (FIG. 8) is conditioned to emit positive signals, and it is also provided with an input line L-51 from the output line of plus NOR gate G47 which transmits carry signal from counter DCU-S. Accordingly, if a carry signal is generated from this counter during the interval when it is counting the value S, as distinguished from the interval when it counts the value M, this will result in a positive output from gate G68 which will be transmitted directly by line L-52 to flip-flop FF-55. As already described, this will result in a positive signal from inverter-amplifier V117 which will energize the error light 60 and also will reset flip-flop FF-54 to the state wherein it prevents printing.

The same circuit arrangement just described is also effective to detect and signal an error condition if it is attempted to use the scale and computer when the signal light 24 is lighted without first operating the tare adjustment knob 23. As noted, under those conditions the output $f67$ is positive, and the positive signal therefrom will set flip-flop FF-54 after it has been reset at the start of the computer cycle. The resulting positive signal from output $f54$ will be transmitted to plus NOR gate G47 (FIG. 10), and this will produce a negative signal to gate G68 (FIG. 8) and a positive signal from gate G68 to flip-flop FF-55 in the same manner as just described. The conditions just described will block the printer from cycling, and it will therefore be necessary at this point to operate both the tare adjustment knob 23 and the reset switch 70, but the interlock connection with the signal light 24 may be omitted if desired, by omitting the connection from output $f67$ to flip-flop FF-54. Under these conditions, the light 24 will still provide a signal when the tare requires attention, but the system will not be blocked from operation.

For purposes of continuity of description, it is assumed at this point that errors have not occured during the operation of any components and that the system is ready to proceed with the printing of a ticket or label. The printing operation begins when the program counter moves to its 1200 position, in which minus NAND gate G67 is caused to transmit a positive signal on line L-53 to plus NAND gate G1017 (FIG. 13). The other two inputs to this gate are from flip-flop outputs $F53$ and $f54'$, and both of these inputs are also positive at this time when conditions are normal. A number of references have been made, however, to the operation of flip-flop FF-54 to prevent printing when conditions are not normal, and it will now be apparent that this result is achieved by reason of the fact that when flip-flop FF-54 is set with its output $f54'$ negative, the desired negative starting signal from gate G1017 will not be produced.

Under normal conditions as just noted, gate G1017 will transmit a negative signal to flip-flop FF-56 causing its output $f56'$ to emit a positive signal which will accomplish four results. The first result will be a positive signal on line L-55 to plus NAND gate G115 (FIG. 12), where it is combined with clock pulse on output $CP/2'$ to produce a negative signal effective through the transformer-inverter 90 and the silicon-controlled rectifier SCR-118 to apply a −24 volt signal to solenoid R410 which causes it to energize and thereby to effect closing of the switch contacts 85 (FIG. 13) which complete the starting circuit for the printer motor 75. When this occurs, the printer mechanism opens the contacts 88 which completed the energizing circuit for solenoid 410 to ground, and it therefore drops out again. The contacts 85, however, are mechanically held in their new positions until the cycle of the printer is completed, as already noted by reference to U.S. Pat. No. 2,948,465.

The second result of the positive signal from output $f56'$ is that it removes the negative voltage on line L-56 which had been holding flip-flops FF-59 to FF-66 so that they will be in condition to emit energizing signals to their associated solenoids R401–408 when caused to do so by their associated storage counters. The third result of the positive signal from output $f56'$ is to remove the previously applied negative holding voltage from flip-flop FF-57.

As shown in FIG. 13, the 9 contact 78-9 constitutes the home position of scanner 77, but this contact is dead not otherwise connected in the circuit. The remaining contacts 78 are alternately connected to form two groups, and the even numbered contacts are connected to an input to flip-flop FF-57' while the odd numbered contacts are similarly connected to an input to flip-flop FF-57.

The fourth result of the positive signal from output $f56'$ is to cause a positive signal to be applied through the associated time trigger in FIG. 13 to flip-flop FF-67 to re-set it from its previous condition. The resulting positive signal from flip-flop output $f57$ passes through the differentiator D-1, which may be composed of a pair of time trigger networks and an amplifying transistor. The result is a short negative pulse which is transmitted on the line L-57 to each of the storage counters for both weight and value through the minus NOR gate which immediately precedes the flip-flops of each counter, namely gate G410 (FIG. 9) for counter DCU-S, gate G216 (FIG. 15) for counter DCU-Z, and so forth. This pulse causes each of the storage counters to advance one count from the state in which it has been. Thus the counter DCU-Y, which had been set to the digit 9, is advanced to 0 and each of the other counters similarly moves to the next higher digit.

When any counter advances to zero as just described, and specifically in the case of counter CU-Y, it issues a carry pulse in the same manner as when it is counting in the normal manner. This carry pulse is applied to the one of the flip-flops FF-59 to FF-66 which is connected to such particular counter, through a time trigger TT-S' to TT-Z' as shown in FIGS. 10 and 15. Thus in this specific example, when counter DCU-Y moves to zero, the carry pulse which it issues is applied through time trigger TT-Y' to flip-flop FF-65, causing its output $f65'$ to issue a negative signal. This signal is changed to positive by the inverter-amplifier VIII, and it there completes an energizing circuit for the solenoid R403, which is the solenoid controlling the setting of the type wheel 36 in the printer 30 for printing the tenths of a pound column.

Since the scanner 77 began its cycle when flip-flop FF-56 was reset as described, it moves next to contact 78-8, completing a circuit from output $f56'$ through inverter V1015. Since all of the even numbered contacts 78 are connected with flip-flop FF-57', its output $f57'$ will issue a positive pulse to differentiator D-1 which is similarly applied as a short negative pulse on line L-57 to the storage counters. All the storage counters will therefore again move through a single count, and since counters DCU-T and DCU-U were originally both set on the digit 8, they will now move to 0 and effect energizing of their associated key solenoids R406 and R407 which control the setting of the type wheels 36 in the printer 30 for printing 8 in the dollars and dimes columns respectively.

It will be apparent that when the counters DCU-U and DCU-T move to zero as just described, the carry pulses which they issue will also be applied as previously described to the next higher value counters DCU-T and DCU-S respectively. These carry pulses, however, will have no effect, because they will be concurrent with the count around pulse from differentiator D-1, so that there will be no additional advancement of counters DCU-T and DCU-S, and the net result will be that each will advance by only a single count.

As the scanner 77 moves through the remainder of its cycle to its contact 78-0, the flip-flop FF-57 will continue to alternate its state as described, so that when scanner 77 reaches contact 78-0, all the storage counters will have advanced a total of ten counts back to the count at which each started, and all of the solenoids R401–R408 will have been energized. During this series of operations, it will be seen that only a single pulse will be issued on line L-57 for the movement of the scanner from each contact 78 to the next, and if there should be discontinuity between the scanner and any of its contacts, such for example as might cause the scanner to bounce on a contact, this will have no effect on the accuracy of the system because once voltage has been applied through a given contact, interruption and reapplication of the same voltage will have no further effect on flip-flop FF-57 and therefore will produce no result in the counters.

As described in U.S. Pat. No. 2,948,465, the type wheels 36 in the printer 30 which correspond to the respective storage counters are set during the return movement of scanner 77 to its home position, and before the scanner reverses its direction of movement for the return portion of its cycle, the cam operated switch 76 closes. This grounds the negative voltage to flip-flop FF-56 and thereby resets it to its original condition and changes its output $f56'$ to negative. Since the output of inverter V1015 is now positive, no signal is transmitted from the scanner 77 as it travels back over the contacts 78. Also, the resulting negative signal to the bottom of flip-flop FF-57 blocks the issuance of further signals on line L-56, and it also resets the flip-flops FF-59 to FF-66 and thereby deenergizes all of the solenoids R401–408.

When all of the key solenoids R401–R408 have operated, which will be before reversal of the movement of the scanner 77 as just noted, all of their associated switch contacts will have closed in the negative input line to flip-flop FF-58, and this will change the output $f58$ to negative. Since the resulting negative signal to plus NAND gate G1031 will occur before the other negative input to this gate is shorted to ground by switch 76, gate G1031 will not receive simultaneous positive inputs and therefore will not transmit a negative signal to minus NOR gate G1032. Since all other inputs to gate G1032 are also positive at this time, its output signal transmitted to flip-flop FF-55 will be negative and will have no effect thereon. It will also be noted that it is only after the scanner 77 has completed its forward travel and set all of the key solenoids that closing of switch 76 causes flip-flop FF-56 to change its output *f*56 to positive and thereby to condition plus NAND gate G1019 to issue a starting signal for the next computing cycle, which will erase the weight and value information for the preceding cycle.

The remainder of the cycle of the printer and ejector accordingly continues in substantially the manner described in U.S. Pat. No. 2,948,466. Thus the ticket ejector motor 81 was started simultaneously with the printer motor 75 by closing of the switch contacts 86, and it operates the ejector mechanism as described in U.S. Pat. No. 2,948,466 to receive the printed ticket from the printer and deliver it to the desired delivery station. The cycle is concluded by the opening of switch contacts 85 and 86 and by removal of the printed ticket.

It will be noted that when the printer cycle began with the energizing of solenoid R410, the opening of the switch contacts 88 removed the ground which was preventing a negative input to inverter V1035. The resulting positive output of inverter V1035 is therefore continuously applied to plus NAND gate G1030 while the printer is in operation, and it is also applied to flip-flop FF-58 but has no effect thereon. When the cycle of the printer motor has concluded with the reclosing of switch contacts 88, the output of inverter V1035 will change to negative, but it will then be grounded through switch 80. The operation of removing the ticket will include temporary opening and closing of switch 80, however, and this will enable the negative signal from invertor V1035 to be applied to flip-flop FF-58, which will change its output *f*58' to negative and thus make possible the start of a subsequent cycle of the computer for the next load to be weighed.

It will be apparent from the foregoing description of a complete cycle that the scale is required to remain stationary only during the read-out of the weight, and that it can then begin a new weighing operation for a second load as soon as the read-out has been completed and while the printer is performing its cycle. Thus since the read-out of weight is completed upon arrival of the program counter at its 1600 position, there is no further need for the photocell information during this cycle, and the use of photocells 55A and 55C for detecting motion of the scale is therefore terminated, by changing the energizing line L-27 from gate G610 to positive. While this will actually occur approximately 120 milliseconds prior to the start of the printer, this is so short an interval that for practical purposes, the operator will be informed that the load can be changed by hearing the printer motor start. This occurs at the 1200 position of the program counter, in which also photocells 55A and 55C are again energized in preparation for the next weighing operation.

It should be noted that if the weighed load is not removed or the platter 21 otherwise disturbed, no further operations will occur, and specifically the computer and printer will not repeat their cycle. This is due to the fact that flip-flop FF-53 was re-set by the signal on line L-50 so that its output *f*53 was positive, and this positive signal to minus NOR gate G1024 produced a negative input to plus NAND gate G1019 preventing the negative output from that gate which is required for a positive starting signal from minus NOR gate G723. Similarly if the load is removed from the platter and the scale is permitted to return to zero, no further action will occur. This result is due to the conditions already described as existing when the scale is resting at zero, and specifically to the use of photocells 55M and 55N for also controlling the resetting signal to flip-flop FF-53.

In normal use of the system of this invention, the operator will replace the weighed load with a new load before the printer cycle is completed. When this is done, the resulting movement of the scale will be effective as previously described through photocells 55A and 55C to create a negative signal from gate G913 which will reset flip-flop FF-53 to negative output *f*53. At this time, the program counter will be resting in its home (1300) position, which it reached before the scanner 77 had begun its cycle, and in which it remained because the output of gate G66 became positive and therefore blocked the delivery of pulses from time trigger TT-3 after switch 76 closed. Therefore when the scale reaches its new balance position, conditions will be in readiness for a new start of the read-out and computing cycle, which will start immediately if the switch 80 has been operated to reset flip-flop FF-58 for the purpose previously described. Otherwise, it will start as soon as switch 80 is operated.

Flip-flop FF-58 also has the function of preventing issuance of an erroneous label in the event that any one of the key solenoids R401–R408 should fail to close during the first half of the cycle of scanner 77. In such event, flip-flop FF-58 will remain with its output *f*58 positive. This input to plus NAND gate G1031 will therefore continue positive when the other input to this gate is made positive by the closing of switch 76, and the resulting positive signal from minus NOR gate G1032 will shift flip-flop FF-55 to its error condition as previously described wherein it causes the error light 60 to be energized and causes flip-flop FF-54 to prevent the start of another printing cycle, by changing the polarity of the *f*54' input to plus NAND gates G1014 and G1017.

If the error condition just described does occur, it is still mechanically necessary that the printer 30 complete its cycle, which will result in the printing of an erroneous ticket, but the operation of flip-flop FF-55 will prevent issuance of such erroneous ticket. Thus the previous positive signal from output *f*55' is removed from plus NAND gate G1016, changing its output to negative and preventing it from transmitting the clock pulse on output CP/2' to the network within the block identified as SCR-81 through which the ejector motor 81 receives its operating power. This network contains a silicon-controlled rectifier, a diode and a small pulse transformer. The arragement is such that the diode forms one-half cycle of the AC power to motor 81, and the other half cycle is furnished by the silicon-controlled rectifier provided the latter is being triggered by the associated pulse transformer, which is the case so long s gate G1016 is receiving a positive signal from output *f*55' and is therefore delivering pulses from clock output CP/2'.

When flip-flop FF-55 is shifted by the occurrence of an error, the resulting cessation of output from gate G1016 stops the application of pulses to the silicon-controlled rectifier in the block SCR-81. The resulting removal of one-half the AC cycle applied to motor 81, which is a shaded pole motor, leaves the motor receiving only half-wave DC voltage, which creates a dynamic braking action. Motor 81 therefore stops and the erroneous ticket is retained within the ejector 35.

When the reset switch 70 is operated to reset flip-flop FF-55 and thus to enable continued operation of the system, switch 70 also restarts motor 81 to deliver the defective ticket. At this point, if the previously weighed package is still on the scale, it is necessary to recycle the computer, either by disturbing the scale and permitting it to return to balance for an automatic start, or by operation of the manual switch 72, which removes the ground from one of the inputs to plus NAND gate G1024 and thereby provides a negative signal to that gate for causing a start in the same manner as a normal automatic start signal from flip-flop output F-53. If the operator has changed the load on the scale, the failure of the ejector to issue a ticket and the necessity of operating the reset switch will call to the operator's attention the fact that the previously weighed package did not receive a proper ticket and that it must be replaced on the scale and re-weighed. It should be noted that a new start is not possible so long as reset switch 70 is operated, since it applies a ground to the start-signal line L-40 from gate G1019 to gate G723.

Flip-flop FF-55 also operates to detect other errors which may occur during a cycle. For example, as is described in U.S. Pat. No. 2,948,465, whenever the commodity key 37 is changed without a change of price setting, switch 65 (FIG. 13) will remain operated. This will remove the ground which was preventing a negative input to flip-flop FF-54, and this input causes output ƒ54 to become positive. This output forms an input to plus NOR gate G47 (FIG. 10), and this gate, as previously pointed out, forms one of the inputs to minus NAND gate G68. Accordingly, when gate G68 is conditioned as previously described during the last four multiplying operations, it will under these conditions transmit a positive signal to flip-flop FF-55 which will result in energizing not only the error light 60 but also the "change price" light 61 in order to distinguish this error condition from other error signals.

Flip-flop FF-55 and switch 65 also cooperate to detect an error condition resulting either from an attempt to change the price setting during the cycle of the computer, or an inaccurate setting of any of the price switches, namely a setting which is between two digits. As described in U.S. Pat. No. 2,948,465, either of these conditions will operate switch 65, and thereafter the sequence for detecting and giving signals of the error is the same as just described in the case of a change of the commodity key without a change of price.

Provision is also made for detecting an error resulting from power failure, however temporary such failure may be. If the failure should occur during readout or computing, then when power is restored, all of the flip-flops which are equipped with P.T.O. inputs will be set accordingly. This will automatically restore the system to a condition of readiness for a cycle, except for operation of the tare adjustment, but the cycle will not automatically start unless the scale is first disturbed and then permitted to return to its balance position, or unless a start is effected manually, by operation of the manual switch 72.

If power failure should occur during operation of the printer, this will be during the interval when switch contacts 88 (FIG. 12) are open, so that the negative input applied to inverter V1035 will result in a positive input to plus NAND gate G1030. When power is restored, the P.T.O. input to flip-flop FF-54 will produce a positive signal on output ƒ54, and this positive input to gate G1030 will produce a negative output therefrom which will in turn form a positive input from gate G1032 to flip-flop FF-55, resetting the latter to the condition wherein its output ƒ55′ causes energizing of the error light 60.

The manual start switch 72 can also be used to start a complete cycle when the balance position of the scale is in the range below .10 pound wherein neither of photocells 55M or 55N is energized. Under these conditions, operation of switch 72 causes the output of minus NOR gate G1024 to become positive independently of the input to this gate from output ƒ53, and this will furnish a start signal to the computer provided the scale is at balance. If the scale is not at balance, the output of plus NAND gate G1019 will be positive because of the negative signal of scale motion transmitted thereto by gate G913, and operation of switch 72 will accordingly have no effect. It should be noted that even when the scale is at balance, manual start switch 72 has no effect unless flip-flop FF-56 has been set by switch 76 to indicate that the scanner 77 has completed the first half of its cycle for the preceding load.

As already noted, provision is made for preventing printing and indicating an error if the balance position of the scale should be above the weight range of the scale or should be below zero, by the use of photocells 55E and 55G, which under normal conditions are never simultaneously energized, as shown by Table Iv. As shown in FIG. 4, the portions of the chart 45 for energizing photocells 55E and 55G are extended below zero and above the 25.00 pounds, which is the assumed calibrated capacity of the scale, so that when ever the scale is in either of these conditions, these two photocells will be energized simultaneously. Preferably, these portions of the chart will be extended beyond the respective points at which the scale platter will engage the usual mechanical stops for positively limiting its movement.

The system of the invention checks to determine whether the balance position of the scale is below zero or above capacity during the interval when it is reading out the Y digit of weight as previously described. During this time, plus NAND gate G1037 receives positive signals from both of flip-flop outputs ƒ45′ and ƒ47′ only if both of photocells 55E and 55G are energized simulatenously. The other inputs to gate G1037 are a signal from plus NAND gate G913, which will also be positive at this time if the scale is at balance, and positive pulses from inverter G815 on line L-16. Therefore if all of the inputs to gate G1037 are postiive, its negative output will constitute a signal of error to gate minus NOR G1032 which produces a positive resetting signal to flip-flop FF-55, followed by the same related results already described.

The input from gate G913 to G1037 as described in the preceding paragraph is important in order to prevent an improper signal of error resulting from simultaneous energizing of photocells 55E and 55G when motion of the scale is so rapid that these photocells produce the effect of being simultaneously energized. Under such conditions, photocells 55A,55C will also be simultaneously energized, and the resulting signal of scale motion will prevent a negative signal from gate G1037 irrespective of the polarity of the other inputs thereto.

It is also possible for photocells 55E and 55G to be energized simultaneously when the scale is temporarily out of its weighing range during weighing movement, but this will not produce a signal of error. Under such conditions, although photocell 55C will not be energized, giving rise to a false signal of balance, neither of photocells 55M and 55N will be energized, since neither of them can be energized except when the scale is within the range of .10 pound to 25.00 pounds. Therefore, there will be no start signal transmitted to gate G723, and since the read out operation will not begin, no signal of the out of range position can be produced from gate G1037. It should also be noted that photocells 55E and 55G similarly prevent operation of the system by means of the manual start switch 72 whenever the result would be erroneous as just described, since their blocking action will come into effect in the same manner when the system attempts to read out the Y digit of weight.

The system can be set to deliver multiple duplicate tickets or labels for application to packages of a fixed weight, such for example as bacon or other pre-weighed meat. The repeat switch 71 has front contacts which control one input to plus NAND gate G1014, and when they are closed, it will ground and make positive the normally negative input to gate G1014 and also to plus NAND gates G1028 and G1029. Gate 1014 receives signals from gate G66 while the program counter is in its home position, and also from outputs *f*54' and *f*58. Therefore when one cycle is completed by removal of the ticket and operation of switch 80, the resulting positive signal from output *f*58 will cause gate G1014 to start a second cycle of the printer, and this repeat action will continue so long as the repeat switch 71 is in its repeat position and there has been no error at any other point in the system and switch 80 is operated for each ticket.

As just noted, repeat operation will terminate whenever an error occurs. For example, if the price setting is changed, the resulting operation of switch 65 will set flip-flop FF-54 to its "error" condition as previously described. The resulting negative signal from output *f*54' will block the printer-start signal from gate G1014, and the positive signal from output *f*54 will combine with that from the front contacts of repeat switch 71 to cause gate G1029 to set flip-flop FF-55 through gate G1032 and thereby to produce a signal or error. If an attempt is made to weigh during repeat operation, the start signal from the time delay network TD-1 and gate G1024 will cause gate G1028 to combine with the input through switch 71 to transmit a signal through gate G1032 to flip-flop FF-55. The resulting error signal from output *f*55' will also reset flip-flop FF-54 to change its output *f*54' and thereby block another negative signal from gate G1014 to flip-flop FF-56.

The load can be removed from the scale and the latter permitted to return to zero during repeat operation without stopping further repeat cycles. Under these conditions, photocells 55M and 55N will block a start signal to the computer and to gate G1028, and the printer can continue to recycle, but if a new load is applied, an error signal will result as described in the preceding paragraph. It should also be noted that repeat switch 71 includes back contacts in the line through reset switch 70 to flip-flop FF-55, so that if an error has occurred, operation cannot be continued until the repeat switch has first been returned to its normal position, and the reset switch 70 has been operated. If it is then desired to return to repeat operation, the repeat switch will not be effective until the system has carried out a normal cycle to reset flip-flop FF-54.

If the repeat switch is operated when there has not been a previous weighing cycle, as for example when the power is first turned on, an error signal will result. Referring to FIGS. 13 and 14, flip-flop FF-54 is set by its P.T.O. input to emit a positive signal on output *f*54 which forms an input to plus NAND gate G1029. The other input to this gate is normally negative but becomes positive when repeat switch 71 is operated. Under these conditions, therefore, gate G1029 will transmit a negative signal to minus NOR gate G1032, and the resulting positive signal therefrom will set flip-flop FF-55 to its error condition. In order to correct this error condition, the repeat switch must be returned to its normal condition, and the reset switch 70 must be operated.

SUMMARY

It is believed that the foregoing detailed description of a complete cycle of operation of the system of the invention may be more readily understood if supplemented by a brief summary of the successive steps of a complete cycle, considered in relation to the position of the program counter, as follows:

| Count | Action |
|---|---|
| 1300–1399 | Home position of program counter in which it remains pending receipt of a signal of motion followed by a signal of no motion. |
| 1400–1499 | Resetting of FF-53 and FF-54, resetting of DCU-S to "5" and all other storage counters to zero. |
| 1500–1519 | Read out of photocells 55M and 55N. Storage of W digit (tens of pounds). |
| 1520–1539 | Read out of photocells 55I to 55L. Storage of X digit (pounds). |
| 1540–1559 | Read out of photocells 55E to 55H. Detection if below zero or over capacity. Storage of Y digit (tenths of a pound). |
| 1560–1579 | Read out of photocells 55A to 55D. Storage of Z digit (hundredths of a pound). |
| 1580–1599 | No action but new weighing operation can begin at 1600 (000). |
| 000–099 | Multiplication RZ and storage in DCU-T with carries in DCU-S. |
| 100–199 | Multiplication RY, storage in DCU-S with carries in DCU-V, and resetting of DCU-T to zero. |
| 200–299 | Multiplication RX and storage in DCU-V with carries in DCU-U. |
| 300–399 | Multiplication RW and storage in DCU-U with carries in DCU-T. |
| 400–499 | Multiplication QZ and storage in DCU-S with carries in DCU-V. |
| 500–599 | Multiplication QY, storage in DCU-V with carries in DCU-U, and resetting of DCU-S to zero. |
| 600–699 | Multiplication QX and storage in DCU-U with carries in DCU-T. |
| 700–799 | Multiplication QW and storage in DCU-T with carries in DCU-S. |
| 800–899 | Multiplication PZ, storage in DCU-V with carries in DCU-U, and detection of excessive value. |
| 900–999 | Multiplication PY, storage in DCU-U with carries in DCU-T, and detection of excessive value. |
| 1000–1099 | Multiplication PX, storage in DCU-T with carries in DCU-S, and detection of excessive value. |
| 1100–1199 | Multiplication PW, storage in DCU-S, and detection of excessive value. |
| 1200–1299 | Printer operation starts. |
| 1300–1399 | Home position of program counter. New cycle can begin when switch 80 is operated |

It should be noted that it is possible beginning with the multiplication QX to generate carries to more than the single next higher decade counter, and it is for this reason that counter DCU-S is reset to zero before the multiplication QX. It should also be noted that the major portion of a complete cycle is consumed by the setting of the printer type wheels and the mechanical operation of printing, which can be carried on simultaneously with the weighing of the next load. Accordingly, the speed of the system as a whole is limited by the speed of the printer, and it will carry out complete cycles at essentially the same unit rate as is required for each cycle of the printer above.

While the illustrated embodiment of the invention includes only enough components for multiplication of weight in four digits by price in three digits, this area of the capacity of the system is readily increased by the addition of one or more counters, and this may be found particularly useful with respect to the value counters for use of the invention in countries other than the United States having currency units substantially lower than the United States dollar in value. For such uses, it may also be necessary to add one or more unit price switches to the switches 31–33 and one more flip-flop to the program counter, but otherwise the operation of the system will follow the same principles. Similarly the weight capacity of the system could be increased to 99.99 units by the addition of two more photocells with their associated chart sections and masks, together with two more gates in counter DCU-W corresponding to the gates G33 and G37 in counter DCU-X. Ordinarily, however, a weight capacity of 25.00 units is adequate, particularly in view of the fact that 25 pounds is equal to less than 12 kilograms for countries using the metric system.

It will accordingly be seen that the invention provides a system for weighing successive loads and computing and recording the weight and value thereof which is especially adapted to construction from solid state elements, although it can also be composed of vacuum tubes and like elements if desired, and which has outstanding characteristics of both speed and accuracy. In addition to these overall advantages, the system of the invention incorporates a number of component circuits and features, as described in detail hereinabove and specified in the claims, all of which contribute to the success of the system as a whole but which are also capable of use individually in other systems.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A computing system for multiplying a four-digit factor by a three-digit factor and expressing the products thereof in terms of 100's, comprising a pulse generator, four pulse counters corresponding respectively to 100's, 1000's, 10000's and 100000's, means for sequentially tramitting pulses to said counters in accordance with the partial products of the respective factor digits, means for directing the partial porducts corresponding to the 1's order to the total product to said 10000's counter and causing carries therefrom to be directed to said 100000's counter, means for directing the partial products corresponding to the 10's order to the total products to said 100000's column and carries therefrom to be directed to said 100's counter, means for resetting said 10000's and 100000's counters to zero following operation of said last named means with respect to the carries directed to said 100's counter, means for directing the partial products corresponding to the 100's order of the total product to said 100's counter and carries therefrom to be directed to said 1000's counter, means for similarly directing the partial products and carries corresponding to the other said higher decade orders of the final products to the corresponding counters.

2. A computing system as defined in claim 1 for expressing the product in terms of 100's rounded off the nearest 100, comprising means for resetting said 100000's counter to "5" in advance of the operation of said directing means for the partial products corresponding to the 10's order of the final product.

3. A computer comprising in combination, first and second factor entering means for entering first and second multi-digit factors, bistable means for selecting places in the first factor to be multiplied in sequence on a digit by digit basis by each place in the second factor, means for producing the partial product of each such multiplication, and a series of counter stages controlled by the selecting means that by partial products accumulation produce the computed value as the sum of such partial products.

4. A computer comprising, in combination, first and second factor entering means for entering first and second multi-digit factors, bistable means for selecting places in the first and second factors to be multiplied on a digit by digit basis producing partial products, means for producing pulses corresponding in number to the parital product of each such multiplication, and register means having a plurality of sections for receiving the pulses and so selected by the bistable means to receive the pulses that a computed value is accummulated as the sum of such partial products.

* * * * *